US011640347B2

(12) United States Patent
Dageville et al.

(10) Patent No.: US 11,640,347 B2
(45) Date of Patent: *May 2, 2023

(54) AUTOMATED QUERY RETRY EXECUTION IN A DATABASE SYSTEM

(71) Applicant: Snowflake Inc., Bozeman, MT (US)

(72) Inventors: Benoit Dageville, San Mateo, CA (US); Johan Harjono, San Francisco, CA (US); Simon Holm Jensen, Menlo Park, CA (US); Kunal Prafulla Nabar, Burlingame, CA (US); Steven James Pelley, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,780

(22) Filed: Jun. 29, 2022

(65) Prior Publication Data

US 2022/0327040 A1   Oct. 13, 2022

Related U.S. Application Data

(63) Continuation of application No. 16/555,996, filed on Aug. 29, 2019, now Pat. No. 11,409,626.

(51) Int. Cl.
*G06F 11/30* (2006.01)
*G06F 16/2458* (2019.01)
(Continued)

(52) U.S. Cl.
CPC ...... *G06F 11/3082* (2013.01); *G06F 11/3409* (2013.01); *G06F 11/3438* (2013.01);
(Continued)

(58) Field of Classification Search
CPC ............ G06F 11/3082; G06F 16/2425; G06F 16/2465; G06F 16/2474; G06F 11/3409; G06F 11/3438
(Continued)

(56) References Cited

U.S. PATENT DOCUMENTS 10,289,629 B1 *  5/2019  Trier ................... H04L 43/0876
10,394,540 B1 *  8/2019  Bentley .............. G06F 9/44505
(Continued)

OTHER PUBLICATIONS

"U.S. Appl. No. 16/555,996, Non-Final Office Action dated Jan. 14, 2022", 30 pgs.
(Continued)

*Primary Examiner* — Hosain T Alam
*Assistant Examiner* — Nicholas E Allen
(74) *Attorney, Agent, or Firm* — Schwegman Lundberg & Woessner, P.A.

(57) ABSTRACT

Techniques for automated query retry in a database platform include decoding, by at least one hardware processor, a query directed to database data from a client account of a database platform. The method further includes decoding, by the at least one hardware processor, an indication that execution of the query on at least one computing node of the database platform results in a failed execution. The method further includes configuring a processing loop with continuous retry executions of the query on the at least one computing node based on the indication. The method further includes exiting the processing loop based on detecting a retry execution of the continuous retry executions results in at least one successful execution of the query. The method includes logging each attempt to execute the query during the continuous retry executions in a query status log until the at least one successful execution of the query.

30 Claims, 15 Drawing Sheets

(51) Int. Cl.
*G06F 11/34* (2006.01)
*G06F 16/242* (2019.01)

(52) U.S. Cl.
CPC ...... *G06F 16/2425* (2019.01); *G06F 16/2465* (2019.01); *G06F 16/2474* (2019.01)

(58) Field of Classification Search
USPC .......................................................... 714/25
See application file for complete search history.

(56) References Cited

U.S. PATENT DOCUMENTS

| | | | |
|---|---|---|---|
| 10,740,156 B1* | 8/2020 | Kumar | G06F 9/5027 |
| 11,372,740 B2 | 6/2022 | Dageville et al. | |
| 2013/0152047 A1* | 6/2013 | Moorthi | G06F 11/368 |
| | | | 717/124 |
| 2015/0254165 A1* | 9/2015 | Baril | G06F 11/3676 |
| | | | 714/38.1 |
| 2016/0026667 A1* | 1/2016 | Mukherjee | G06F 3/0679 |
| | | | 707/714 |
| 2017/0230272 A1 | 8/2017 | Blake et al. | |
| 2017/0316220 A1* | 11/2017 | Eldar | G06F 21/602 |
| 2018/0060395 A1* | 3/2018 | Pathak | H04L 67/1008 |
| 2018/0157584 A1* | 6/2018 | Forbes | G06F 11/3692 |
| 2019/0147085 A1* | 5/2019 | Pal | G06F 16/24542 |
| | | | 707/718 |
| 2019/0294596 A1* | 9/2019 | Yan | G06F 11/3688 |
| 2019/0303375 A1* | 10/2019 | Bai | G06F 16/9535 |
| 2019/0361916 A1* | 11/2019 | Weaver | G06F 16/2365 |
| 2020/0050586 A1* | 2/2020 | Pal | G06F 16/148 |
| 2020/0050607 A1* | 2/2020 | Pal | G06F 16/24545 |
| 2020/0073987 A1* | 3/2020 | Perumala | G06F 16/24545 |
| 2021/0064502 A1 | 3/2021 | Dageville et al. | |
| 2021/0064503 A1 | 3/2021 | Dageville et al. | |
| 2022/0269573 A1 | 8/2022 | Dageville et al. | |

OTHER PUBLICATIONS

"U.S. Appl. No. 16/555,996, Notice of Allowance dated May 6, 2022", 7 pgs.
"U.S. Appl. No. 16/555,996, Response filed Apr. 12, 2022 to Non-Final Office Action dated Jan. 14, 2022", 23 pgs.
"U.S. Appl. No. 17/007,589, Advisory Action dated Aug. 16, 2021", 3 pgs.
"U.S. Appl. No. 17/007,589, Decision on Pre-Appeal Brief Request for Review dated Sep. 21, 2021", 2 pgs.
"U.S. Appl. No. 17/007,589, Examiner Interview Summary dated Mar. 11, 2022", 2 pgs.
"U.S. Appl. No. 17/007,589, Final Office Action dated Apr. 16, 2021", 17 pgs.
"U.S. Appl. No. 17/007,589, Non-Final Office Action dated Dec. 6, 2021", 23 pgs.
"U.S. Appl. No. 17/007,589, Non-Final Office Action dated Dec. 9, 2020", 17 pgs.
"U.S. Appl. No. 17/007,589, Notice of Allowability dated Apr. 20, 2022", 4 pgs.
"U.S. Appl. No. 17/007,589, Notice of Allowance dated Apr. 11, 2022", 7 pgs.
"U.S. Appl. No. 17/007,589, Pre-Appeal Brief Request for Review filed Aug. 16, 2021", 5 pgs.
"U.S. Appl. No. 17/007,589, Response filed Feb. 28, 2022 to Non-Final Office Action dated Dec. 6, 2021", 21 pgs.
"U.S. Appl. No. 17/007,589, Response filed Mar. 9, 2021 to Non-Final Office Action dated Dec. 9, 2020", 10 pgs.
"U.S. Appl. No. 17/007,589, Response filed Jul. 16, 2021 to Final Office Action dated Apr. 16, 2021", 11 pgs.
"U.S. Appl. No. 17/007,589, Response filed Oct. 21, 2021 to Advisory Action dated Aug. 16, 2021", 11 pgs.
"U.S. Appl. No. 17/663,253, Non-Final Office Action dated Jul. 25, 2022", 29 pgs.

* cited by examiner

AUTOMATED QUERY RETRY EXECUTION IN A DATABASE SYSTEM

CROSS-REFERENCE TO RELATED APPLICATION

This application is a Continuation of U.S. patent application Ser. No. 16/555,996, filed Aug. 29, 2019, the contents of which are hereby incorporated by reference in their entirety.

TECHNICAL FIELD

The present disclosure relates to databases and more particularly relates to automated query retry in database systems.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

In some instances, the execution of a query fails. Query execution may fail for a number of different reasons, including an intermittent fault or a software regression. An intermittent fault may be caused by a hardware failure, a power outage, a fault electrical connection, a change in temperature, vibration, and others. Intermittent faults are very difficult to predict and identify. A software regression may be caused by a bug or error in software code. Software regressions can cause continued issues with query execution and should therefore be identified and repaired. In some instances, it is desirable to retry failed queries so that a valid query response can be returned to a client.

In light of the foregoing, disclosed herein are systems, methods, and devices for automated query retry in a database system. The systems, methods, and devices disclosed herein provide means for querying data, determining how and where queries should be retried, and analyzing query retries.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
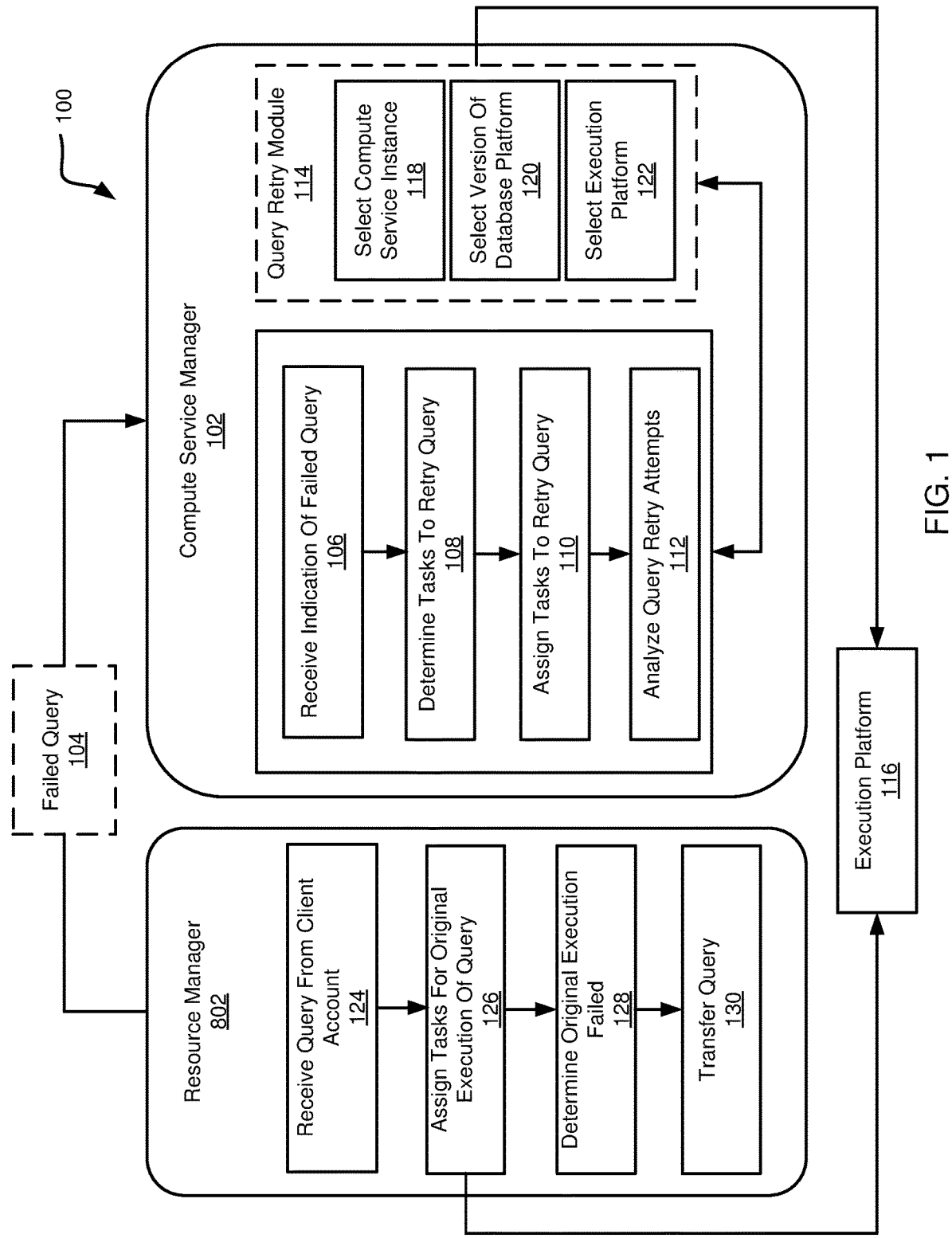
FIG. 1 is a block diagram illustrating an example process flow for scheduling tasks on a database and decoupling internal and external tasks in a database platform.

Disclosed herein are systems, methods, and devices for automated query retry in a database platform. The systems, methods, and devices of the disclosure can be implemented to automatically retry a failed query and identify system errors based on the query retry attempts. Embodiments of the disclosure can be implemented to identify software regressions in a database platform. Additionally, embodiments of the disclosure can be implemented to distinguish software regressions from intermittent faults.

In an embodiment of the disclosure, a method may be implemented by a resource manager and/or compute service manager of a database platform. The method includes receiving a query directed to database data and assigning execution of the query to one or more execution nodes of an execution platform. The one or more execution nodes may be configured to execute the query on a first software version of the database platform. The method includes determining that execution of the query was unsuccessful. The method includes assigning a first retry execution of the query on the first software version of the database platform and assigning a second retry execution of the query on a second software version of the database platform. The first and second retry executions of the query may be analyzed to determine whether the original, failed execution of the query failed due to a software regression or an intermittent fault. In an embodiment, the query is successful at most one time such that additional retry attempts are scheduled only after previous retry attempts have failed. In such an embodiment, if a first retry attempt is successful, then no additional retry attempts will be scheduled.

Databases are widely used for data storage and data access in computing applications. Databases may include one or more tables that include or reference data that can be read, modified, or deleted using queries. However, for some modern data warehouse systems, executing a query can be exceptionally time and resource intensive because modern data warehouse systems often include tables storing petabytes of data. Querying very large databases and/or tables might require scanning large amounts of data. Reducing the amount of data scanned for database queries is one of the main challenges of data organization and processing. When processing a query against a very large sum of data, it can be important to use materialized views to reduce the amount of time and processing resources required to execute the query. The systems, methods, and devices of the disclosure provide means for automatically retrying failed queries and performing analysis on query retry attempts.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example" or "an example" means that a particular feature, structure or characteristic described in connection with the embodiment or example is included in at least one embodiment of the present disclosure. Thus, the appearances of the phrases "in one embodiment," "in an embodiment," "one example" or "an example" in various places throughout this specification are not necessarily all referring to the same embodiment or example. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system may utilize a SQL (Structured Query Language)-based relational database. However, these systems and methods are applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

As used herein, the terms "comprising," "including," "containing," "characterized by," and grammatical equivalents thereof are inclusive or open-ended terms that do not exclude additional, unrecited elements or method steps.

As used herein, a database table is a collection of records (rows). Each record contains a collection of values of table attributes (columns). Database tables are typically physically stored in multiple smaller (varying size or fixed size) storage units, e.g. files or blocks.

As used herein, a micro-partition is an immutable storage device in a database table that cannot be updated in-place and must be regenerated when the data stored therein is modified.

Some embodiments of the disclosure may refer to a "micro-partition" as storing a portion of the data in a database table. The micro-partition as discussed herein may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata. Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Referring now to the figures, FIG. 1 is a block diagram of an example embodiment of a process flow 100 for managing and executing query retry jobs on a database system and decoupling external and internal tasks in a database platform. In an embodiment, the process flow 100 is carried out by a compute service manager 102 that is configured to manage and assign query retry tasks and a resource manager 802 that is configured to manage and assign the execution of queries received from client accounts. In the process flow 100, a resource manager 802 receives a query from a client account at 124. The resource manager 802 references metadata to identify one or more files that are responsive to the query. The resource manager 802 assigns processing of the one or more files to one or more execution nodes of an execution platform 116 at 126. The resource manager determines that the original execution of the query failed at 128. If the original execution of the query failed due to an internal error, rather than a non-internal "user error" based on a user's query text or data, then the resource manager 802 transfer the query to a compute service manager 102 at 130. A non-internal user error may include an error in the Structured Query Language (SQL) text of the query, an error based on the actual data being processed. In the process flow 100, the compute service manager 102 receives an indication at 106 of a failed query 104. In an embodiment, the compute service manager 102 receives this indication by receiving a query retry job in its queue. In an embodiment, the resource manager 802 transfer the query by placing the query in the queue of the compute service manager 102. The indication of the failed query 104 may be a positive/negative indication that only indicates the query failed and does not provide additional information about why or when the query failed. The compute service manager 102 determines at 108 tasks to be performed to retry the query and assigns those tasks at 110 to one or more execution nodes of one or more execution platforms 116. The compute service manager 102 analyzes the query retry attempt(s) at 112.

Figure 2:
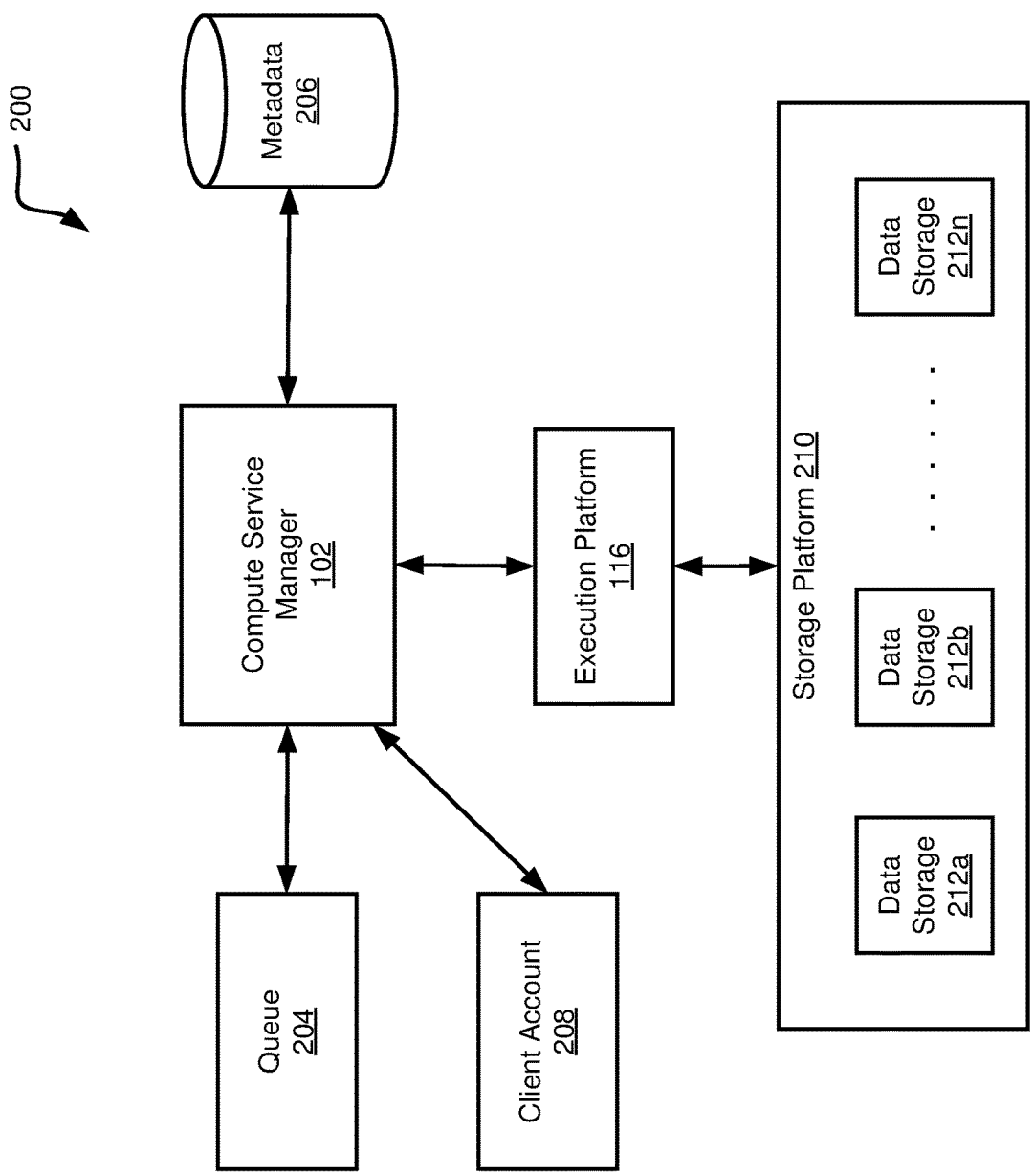
FIG. 2 is a block diagram illustrating a data processing platform.
Figure 3:
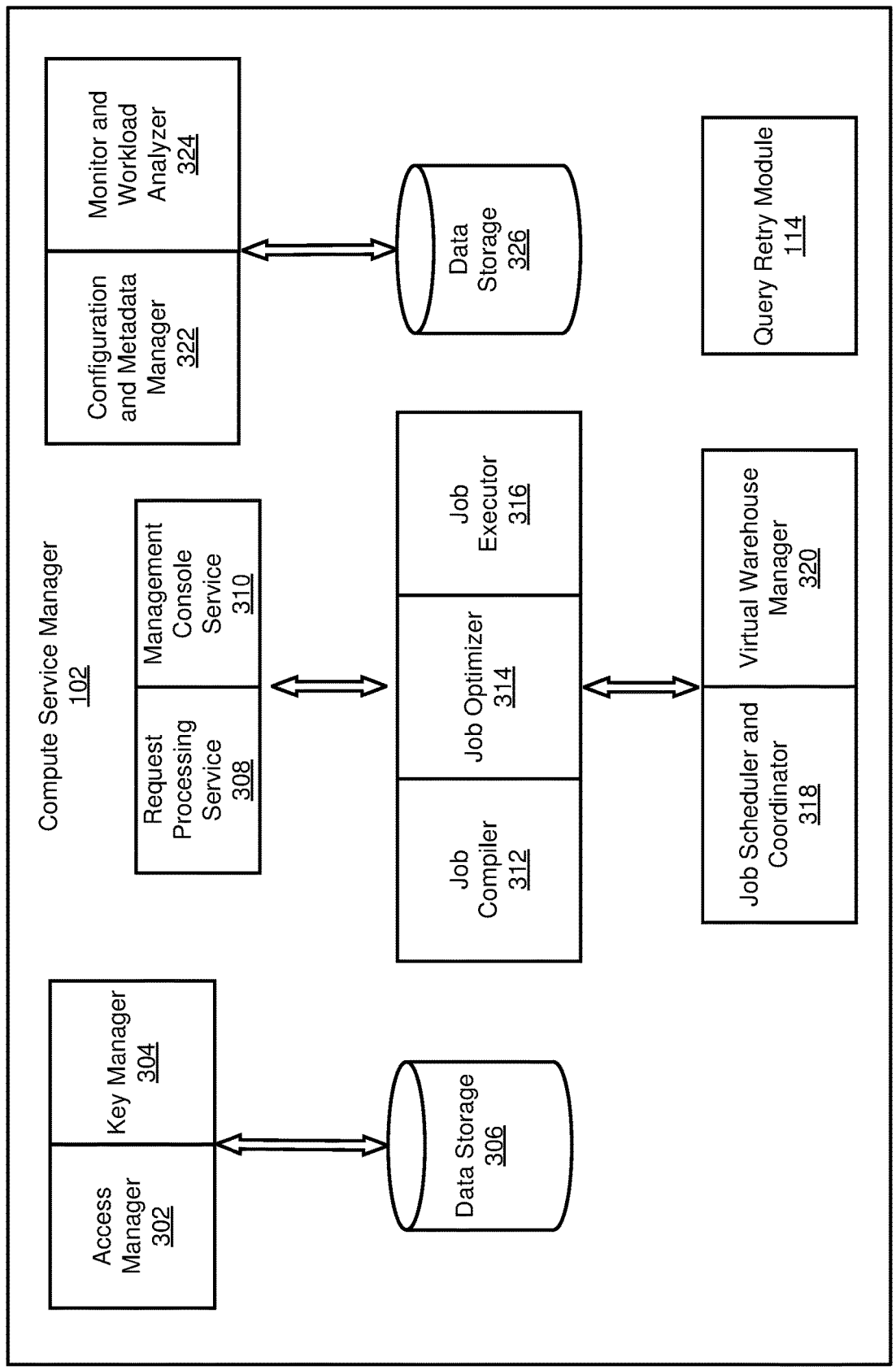
FIG. 3 is a block diagram illustrating a compute service manager.

The compute service manager 102 shown in FIGS. 1-3 is a representation of a compute service instance. The compute service manager 102 may be one of multiple compute service instances serving a multiple tenant cloud-based database platform. In an embodiment, one or more compute service managers 102 are assigned to manage all "internal" tasks for a single client account. The compute service manager 102 may be assigned to manage internal tasks for one or more client accounts. One client account may have multiple compute service managers 102 assigned thereto. The multiple compute service instances are configured to collectively manage the execution of internal database tasks that are not received directly from client accounts. Such internal tasks include, for example, retrying a failed query, refreshing a materialized view, refreshing a table aggregation, clustering a table, and so forth.

The compute service manager 102 may work in connection with one or more resource managers 802. In an embodiment, there is a resource manager 802 for each compute service manager across the database platform. In an embodiment, the number of resource managers 802 and the number of compute service managers 102 is unequal. The resource managers 802 are similar to the compute service managers 102 with the exception that resource managers 802 are configured to manage the execution of "external" database tasks that are received from a client account. Such external tasks may include, for example, a query request received from a client, a request to generate a materialized view, a request to calculate an aggregation, and so forth. The resource managers may include each of the components associated with the compute service manager 102 as illustrated in FIG. 3 and may include additional components as needed. The compute service managers 102 and the resource managers 802 may work together and may transfer work between one another. For example, a query request may originate from a client account and be received by the resource manager 802. If execution of the query fails, the query retry attempts may be transferred from the resource manager 802 to the compute service manager 102. Across the database platform, different compute service managers 102 and resource managers 802 may be running different software versions of the database platform at the same time.

As discussed herein, the term "database query manager" may generically refer to either of the compute service manager 102 and/or the resource manager 802. The compute service manager 102 and the resource manager 802 have similar components and may perform similar tasks and may be interchangeable in some instances and/or may be particularly assigned to certain tasks, certain clients, certain portions of the database data, and so forth.

The compute service manager 102 may determine the tasks for retrying the query at 108 by numerous different methods. The compute service manager 102 may receive an indication from a client or system administrator that the query should be retried on a certain compute service instance, a certain version of software for the database platform, by a certain execution platform, and so forth. Alternatively, the compute service manager 102 may make these determinations with a query retry module 114. The query retry module 114 may select a compute service instance at 118 for identifying and assigning tasks for executing the retry of the query. The query retry module 114 may select a version of the database platform at 120 on which the query should be retried. The query retry module 114 may select an execution platform 122 for performing the retry of the query.

In an embodiment, the compute service manager 102 schedules and manages the execution of query retries on behalf of a client account. The compute service manager 102 may schedule any arbitrary SQL query. The compute service manager 102 may assume a role to schedule the failed query 104 as if it is the client account rather than as an internal account or other special account. The compute service manager 102 may embody the role of, for example, an account administrator or a role having the smallest scope necessary to complete the retry of the failed query 104.

In an embodiment, the compute service manager 102 determines tasks to retry the query at 108 and assigns those tasks at 110. The compute service manager 102 may generate one or more discrete units of work that may be referred to as a task. The task includes, for example, a task type, a task identification, an account identification, a payload which may be converted to one or more discrete tasks, and a set of options that control how the failed query 104 is retried (e.g. indicates a number of retries). In an embodiment, the compute service manager 102 identifies one or more micro-partitions of data that need to be read to retry the query. The compute service manager 102 may form batches of micro-partitions that need to be read to retry the query and may assign one or more batches to different execution nodes of the execution platform 116. The compute service manager 102 may determine how many times the query should be retried and whether the query should be retried on different compute service instances or on different versions of the software of the database platform. The compute service manager 102 may further determine if the query should be retried on different execution nodes or execution platforms. The compute service manager 102 may determine how many times the query should be retried and where the query should be retried based on the reason for the original failure of the query. If the reason for the original failure of the query is unknown, then the compute service manager 102 may determine how many times and where the query should be retried in an effort to identify why the query original execution of the query failed.

The compute service manager 102 may assign tasks to retry the query 110. In an embodiment, the compute service manager 102 identifies multiple micro-partitions of data that need to be read to retry the query and assigns each of the multiple micro-partitions to one or more execution nodes of an execution platform 116. The compute service manager 102 may assign tasks based on storage and processing availability of the multiple execution nodes of the execution platform. The compute service manager 102 may assign tasks in an effort to identify why the original execution of the query failed. For example, the compute service manager 102 may assign the query retry to the same one or more execution nodes that originally attempted to execute the query. The compute service manager 102 may assign the query retry to new execution nodes that did not participate in the original failed execution of the query.

The compute service manager 102 analyzes the query retry attempts at 112 to identify why the query failed. The compute service manager 102 may determine the query failed due to an intermittent fault. Database queries can fail due to numerous different intermittent faults that may be caused by an electrical issue, a circuit issue, change in temperature, vibration, voltage issues, power outages, and so forth. In an embodiment, the compute service manager 102 may determine that the query failed due to an intermittent fault but may not identify what caused the intermittent fault. In an example, the compute service manager 102 may retry the query with the same compute service instance, the same execution nodes, and the same version of the database platform as the original execution attempt for the query. If the query retry is successful without changing any of the compute service instance, the execution nodes, or the version of the database platform, the compute service manager 102 may deduce that the original execution of the query failed due to an intermittent fault.

Alternatively, the compute service manager 102 may determine the query failed due to a system issue such as a bug or error in the software or firmware for the database platform. The compute service manager 102 may run the query on the same version of the database platform (i.e., the same software and code for the database platform) as the original run of the query that failed. The computer service manager 102 may additionally run the query on other versions of the database platform. The compute service manager 102 may determine that the query failed due to a system error based on the results of the multiple query retries. For example, if the query retry on the same version of the database platform fails again, and the query retry on a different version of the database platform is executed successfully, then the compute service manager 102 may deduce there is an error in the software for the database platform in the version that was used for the original execution of the query.

In an embodiment, the compute service manager 102 generates a report indicating when a failed query 104 is scheduled to be retried and the amount of computing resources that are estimated to be tied up retrying the failed query 104. The compute service manager 102 may generate a statement for each task that exposes the failed query 104 to an applicable client account by way of a filter. The compute service manager 102 may alert a client account when a failed query 104 is being retried.

The query retry module 114 may select a compute service instance at 118 to manage the query retry. In an embodiment, the compute service manager 102 is one of multiple compute service managers serving a multiple tenant cloud-based database platform. The query retry module 114 may be incorporated in the same compute service manager 102 that managed the original, failed execution of the query. The query retry module 114 may determine that the query retry should be performed by the same compute service manager 102 and/or by one or more different compute service instances. In an embodiment, the multiple compute service instances across the database platform are running different versions of software for the database platform at any given time. For example, a new version of the software for the database platform may be rolled out on a select number of compute service instances while other compute service instances continue to run older versions of the software. This gradual rollout can assist in identifying any errors or bugs in the newly rolled out software. The query retry module 114 may determine that the query should be retried multiple times by multiple different compute service instances. The query retry module 114 may make this determination in an effort to identify whether the original execution of the query failed due to an intermittent fault or a repeating system error.

In an embodiment, the query retry module 114 selects a compute service instance to manage the query retry based on availability of the multiple compute service instances across the database platform. In an embodiment, the original, failed execution of the query is managed by a resource manager that handles "external" jobs received from client accounts such as client-requested queries. The retry of the query may then be handled by a compute service manager that handles "internal" jobs that are not client-facing. Internal jobs include, for example, query retries, refreshing materialized views, performing adaptive aggregation of database data, updating metadata, and so forth. In various embodiments, the query retry module 114 shown in FIG. 1 may be incorporated in a resource manager and/or a compute service manager and may be associated with the same resource manager and/or compute service manager that oversaw a failed execution of the query.

The query retry module 114 may select a version of the database platform at 120 on which the query retry should be performed. In an embodiment, the systems, methods, and devices disclosed herein are part of a multiple tenant cloud-based database platform. The database platform may have multiple resource managers (for executing external jobs) and multiple compute service managers (for executing internal jobs). Each of the multiple resource managers and multiple compute service managers could be operating under different versions of software for the database platform. In an embodiment, when a new version of software for the database platform is rolled out, the new version is installed in only a select number of resource managers and/or compute service managers. The remaining resource managers and/or compute service managers may continue to run older versions of the software for the database platform. The query retry module 114 may select one of the multiple available versions of software for running the query retry.

In an embodiment, the query retry module 114 determines that the query should be retried on the same version of software as the original, failed execution attempt. The query retry module 114 may determine that the query should additionally be retried on one or more other versions of software. The results of these multiple retry attempts may be analyzed to determine whether the original, failed execution of the query failed due to an intermittent fault or a system error.

The query retry module 114 may select one or more execution nodes or execution platforms at 122 to perform the one or more retry attempts. The query retry module 114 may select the execution resources based on storage and/or processing availability and/or current workload. The query retry module 114 may select the same execution resources that attempted to perform the original, failed execution of the query because those execution resources may have already cached some portion of data that is responsive to the query. The query retry module 114 may select the same execution resources that attempted to perform the original, failed execution of the query in an effort to identify whether the original execution of the query failed due to an intermittent fault or a system error. In an embodiment, there is no central query retry module 114 that determines the execution resources for multiple retry attempts, and instead these determinations are made by each individual compute service instance that is assigning tasks for executing the query retry.

In an embodiment, the query retry module 114 selects one or more execution nodes to perform one or more retry attempts on the query. The query retry module 114 may determine that a query will be retried multiple times using different execution nodes. A first retry execution of the query may be performed on the same execution nodes that attempted the original, failed execution of the query. A second retry execution of the query may be performed on different execution nodes that did not attempt the original, failed execution of the query. A third retry execution of the query may be performed by a mixture of execution nodes that did and did not attempt the original, failed execution of the query. The query retry module 114 may schedule multiple retries of the query until the query or is successful and/or a cause of the original failure of the query has been identified. For example, it may be determined that the original failure of the query was caused by a hardware issue or a problem with a specific server that was involved in the original execution of the query. This determination may be made by performing multiple retries of the query using multiple different execution nodes.

In an embodiment, the query retry module 114 determines at 122 that the query should be retried on the same execution nodes that attempted to execute the original, failed execution of the query. The result of this retry attempt may be analyzed to determine if there is a hardware issue with a specific server. If the query retry fails on the same execution nodes used for the original, failed execution of the query, this may indicate that further investigation should be made to determine whether there is an issue with the server running those one or more execution nodes.

In an embodiment, the query retry module 114 first selects one or more versions of the database platform at 120 to perform the one or more query retries. The query retry module 114 may then select one or more compute service instances at 118 to manage the one or more query retries. The query retry module 114 may select compute service instances based on which version of the database platform the compute service instances are currently running.

The query retry module 114 may be incorporated into a compute service manager 102 as shown in FIG. 1. Alternatively, the query retry module 114 may be separate from any compute service instance and may be configured to make determinations about query retry attempts for one or more accounts of a multiple tenant database platform. A separate instance of the query retry module 114 may be incorporated in each compute service instance. A single instance of the query retry module 114 may be incorporated in a single compute service instance and may make determinations about query retry attempts for one or more accounts of a multiple tenant database platform.

Modifications may be made to the process flow 100 in FIG. 1 without departing from the scope of the disclosure. For example, the determinations made by the query retry module 114 may be made by a compute service manager 102 that received a query retry job in its queue. The determinations made by the query retry module 114 may be made by the resource manager that managed the original, failed execution of the query. The determinations made by the query retry module 114 may be made by some other resource manager 802 and/or compute service manager 102.

In an embodiment, the resource manager 802 that managed the original, failed execution of the query further determines whether the query can be retried, whether the query should be retried, where the query should be retried, on which version of the database platform the query should be retried, and which compute service manager should manage the retry of the query. The resource manager 802 may transfer the query to the appropriate compute service manager based on these determinations. In an embodiment, a compute service manager that oversees a retry attempt of the query may generate additional retry attempts based on whether the retry attempted was successful or unsuccessful. In an embodiment, the resource manager 802 that managed the original, failed execution of the query may transfer the query to multiple different compute service managers for the query to be retried multiple times. The resource manager 802 may determine that the query should be retried on multiple versions of the database platform, on multiple different execution nodes, and by multiple compute service managers and/or resource managers.

In an embodiment, a transaction log is stored in a metadata store and/or across one or more of a plurality of shared storage devices in a database platform. The transaction log may comprise a listing of all the jobs that have been performed for a client account. The transaction log may include a listing of each query retry attempt for a single query. In an embodiment, the client account may request the transaction log and a filtered transaction log may be generated that omits the query retry attempts and comprises only an indication of the original execution of the query and/or a successful retry attempt for the query. The filtered transaction log may be provided to the client account. In an embodiment, the transaction log comprises a listing of all "external" jobs that were performed based on direct request from the client account and omits all "internal" jobs that are done for improving performance of the database platform and are not received from the client account. In an embodiment, the client account may request a specialized transaction log that comprises a listing of all external and/or internal jobs the client account wishes to see. In an embodiment, a transaction log is generated that comprises a listing of all attempts to execute a single query, all queries over a time period, all queries directed at certain database data, and so forth.

FIG. 2 is a block diagram depicting an example embodiment of a data processing platform 200. As shown in FIG. 2, a compute service manager 102 is in communication with a queue 204, a client account 208, metadata 206, and an execution platform 116. In an embodiment, the compute service manager 102 does not receive any direct communications from a client account 208 and only receives communications concerning jobs from the queue 204. The jobs in the queue 204 may include, for example, retrying a failed query, refreshing a materialized view, refreshing an aggregation, reclustering a table, and so forth. In particular implementations, the compute service manager 102 can support any number of client accounts 208 such as end users providing data storage and retrieval requests, system administrators managing the systems and methods described herein, and other components/devices that interact with compute service manager 102. As used herein, compute service manager 102 may also be referred to as a "global services system" that performs various functions as discussed herein.

The compute service manager 102 is in communication with a queue 204. The queue 204 may provide a job to the compute service manager 102 in response to a trigger event. In an embodiment, the trigger event is a failed query and the job is a retry of the failed query. In an embodiment, the resource manager 802 that managed the original, failed execution of the query is configured to enter a job in the queue 204 indicating that the compute service manager 102 should retry the query. This decoupling of external tasks (e.g., queries received from client accounts) and internal tasks (e.g., retrying queries) can ensure that resource managers 802 are available to receive client requests and that processing resources are not consumed on internal tasks while external tasks are waiting. One or more jobs may be stored in the queue 204 in an order of receipt and/or an order of priority, and each of those one or more jobs may be communicated to the compute service manager 102 to be scheduled and executed. The queue 204 may determine a job to be performed based on a trigger event such as the failure of a query, ingestion of data, deleting one or more rows in a table, updating one or more rows in a table, a materialized view becoming stale with respect to its source table, a table reaching a predefined clustering threshold indicating the table should be reclustered, and so forth. The queue 204 may determine internal jobs that should be performed to improve the performance of the database and/or to improve the organization of database data. In an embodiment, the queue 204 does not store queries to be executed for a client account but instead only includes database jobs that improve database performance.

The compute service manager 102 is also coupled to metadata 206, which is associated with the entirety of data stored throughout data processing platform 200. In some embodiments, metadata 206 includes a summary of data stored in remote data storage systems as well as data available from a local cache. Additionally, metadata 206 may include information regarding how data is organized in the remote data storage systems and the local caches. Metadata 206 allows systems and services to determine whether a piece of data needs to be accessed without loading or accessing the actual data from a storage device.

In an embodiment, the compute service manager 102 and/or the queue 204 may determine that a job should be performed based on the metadata 206. In such an embodiment, the compute service manager 102 and/or the queue 204 may scan the metadata 206 and determine that a job should be performed to improve data organization or database performance.

The compute service manager 102 may receive rules or parameters from the client account 208 and such rules or parameters may guide the compute service manager 102 in scheduling and managing internal jobs. The client account 208 may indicate that internal jobs should only be executed at certain times or should only utilize a set maximum amount of processing resources. The client account 208 may further indicate one or more trigger events that should prompt the compute service manager 102 to determine that a job should be performed. The client account 208 may provide parameters concerning how many times a task may be re-executed and/or when the task should be re-executed. In an embodiment, the compute service manager 102 is configured to prioritize query retries over other internal tasks.

The compute service manager 102 is further coupled to an execution platform 116, which provides multiple computing resources that execute various data storage and data retrieval tasks, as discussed in greater detail below. Execution platform 116 is coupled to multiple data storage devices 212a, 212b, and 212n that are part of a storage platform 210. Although three data storage devices 212a, 212b, and 212n are shown in FIG. 2, execution platform 116 is capable of communicating with any number of data storage devices. In some embodiments, data storage devices 212a, 212b, and 212n are cloud-based storage devices located in one or more geographic locations. For example, data storage devices 212a, 212b, and 212n may be part of a public cloud infrastructure or a private cloud infrastructure. Data storage devices 212a, 212b, and 212n may be hard disk drives (HDDs), solid state drives (SSDs), storage clusters, Amazon S3™ storage systems or any other data storage technology. Additionally, storage platform 210 may include distributed file systems (such as Hadoop Distributed File Systems (HDFS)), object storage systems, and the like.

In particular embodiments, the communication links between compute service manager 102, the queue 204, metadata 206, the client account 208, and the execution platform 116 are implemented via one or more data communication networks. Similarly, the communication links between execution platform 116 and data storage devices 212a-212n in the storage platform 210 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 2, data storage devices 212a, 212b, and 212n are decoupled from the computing resources associated with the execution platform 116. This architecture supports dynamic changes to data processing platform 200 based on the changing data storage/retrieval needs as well as the changing needs of the users and systems accessing data processing platform 200. The support of dynamic changes allows data processing platform 200 to scale quickly in response to changing demands on the systems and components within data processing platform 200. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Compute service manager 102, queue 204, metadata 206, client account 208, execution platform 116, and storage platform 210 are shown in FIG. 2 as individual components. However, each of compute service manager 102, queue 204, metadata 206, client account 208, execution platform 116, and storage platform 210 may be implemented as a distributed system (e.g., distributed across multiple systems/platforms at multiple geographic locations). Additionally, each of compute service manager 102, metadata 206, execution platform 116, and storage platform 210 can be scaled up or down (independently of one another) depending on changes to the requests received from the queue 204 and/or client accounts 208 and the changing needs of data processing platform 200. Thus, in the described embodiments, data processing platform 200 is dynamic and supports regular changes to meet the current data processing needs.

During typical operation, data processing platform 200 processes multiple jobs received from the queue 204 or determined by the compute service manager 102. These jobs are scheduled and managed by the compute service manager 102 to determine when and how to execute the job. For example, the compute service manager 102 may divide the job into multiple discrete tasks and may determine what data is needed to execute each of the multiple discrete tasks. The compute service manager 102 may assign each of the multiple discrete tasks to one or more nodes of the execution platform 116 to process the task. The compute service manager 102 may determine what data is needed to process a task and further determine which nodes within the execution platform 116 are best suited to process the task. Some nodes may have already cached the data needed to process the task and, therefore, be a good candidate for processing the task. Metadata 206 assists the compute service manager 102 in determining which nodes in the execution platform 116 have already cached at least a portion of the data needed to process the task. One or more nodes in the execution platform 116 process the tasks using data cached by the nodes and, if necessary, data retrieved from the storage platform 210. It is desirable to retrieve as much data as possible from caches within the execution platform 116 because the retrieval speed is typically much faster than retrieving data from the storage platform 210.

As shown in FIG. 2, the data processing platform 200 separates the execution platform 116 from the storage platform 210. In this arrangement, the processing resources and cache resources in the execution platform 116 operate independently of the data storage resources 212a-212n in the storage platform 210. Thus, the computing resources and cache resources are not restricted to specific data storage resources 212a-212n. Instead, all computing resources and all cache resources may retrieve data from, and store data to, any of the data storage resources in the storage platform 210. Additionally, the data processing platform 200 supports the addition of new computing resources and cache resources to the execution platform 116 without requiring any changes to the storage platform 210. Similarly, the data processing platform 200 supports the addition of data storage resources to the storage platform 210 without requiring any changes to nodes in the execution platform 116.

FIG. 3 is a block diagram depicting an embodiment of the compute service manager 102. As shown in FIG. 3, the compute service manager 102 includes an access manager 302 and a key manager 304 coupled to a data storage device 306. Access manager 302 handles authentication and authorization tasks for the systems described herein. Key manager 304 manages storage and authentication of keys used during authentication and authorization tasks. For example, access manager 302 and key manager 304 manage the keys used to access data stored in remote storage devices (e.g., data storage devices in storage platform 210). As used herein, the remote storage devices may also be referred to as "persistent storage devices" or "shared storage devices." A request processing service 308 manages received data storage requests and data retrieval requests (e.g., jobs to be performed on database data). For example, the request processing service 308 may determine the data necessary to process the received data storage request or data retrieval request. The necessary data may be stored in a cache within the execution platform 116 (as discussed in greater detail below) or in a data storage device in storage platform 210. A management console service 310 supports access to various systems and processes by administrators and other system managers. Additionally, the management console service 310 may receive a request to execute a job and monitor the workload on the system.

The compute service manager 102 also includes a job compiler 312, a job optimizer 314 and a job executor 310. The job compiler 312 parses a job into multiple discrete tasks and generates the execution code for each of the multiple discrete tasks. The job optimizer 314 determines the best method to execute the multiple discrete tasks based on the data that needs to be processed. The job optimizer 314 also handles various data pruning operations and other data optimization techniques to improve the speed and efficiency of executing the job. The job executor 316 executes the execution code for jobs received from the queue 204 or determined by the compute service manager 102.

A job scheduler and coordinator 318 sends received jobs to the appropriate services or systems for compilation, optimization, and dispatch to the execution platform 116. For example, jobs may be prioritized and processed in that prioritized order. In an embodiment, the job scheduler and coordinator 318 determines a priority for internal jobs that are scheduled by the compute service manager 102 with other "outside" jobs such as user queries that may be scheduled by other systems in the database but may utilize the same processing resources in the execution platform 116. In some embodiments, the job scheduler and coordinator 318 identifies or assigns particular nodes in the execution platform 116 to process particular tasks. A virtual warehouse manager 320 manages the operation of multiple virtual warehouses implemented in the execution platform 116. As discussed below, each virtual warehouse includes multiple execution nodes that each include a cache and a processor.

Additionally, the compute service manager 102 includes a configuration and metadata manager 322, which manages the information related to the data stored in the remote data storage devices and in the local caches (i.e., the caches in execution platform 116). As discussed in greater detail below, the configuration and metadata manager 322 uses the metadata to determine which data files need to be accessed to retrieve data for processing a particular task or job. A monitor and workload analyzer 324 oversees processes performed by the compute service manager 102 and manages the distribution of tasks (e.g., workload) across the virtual warehouses and execution nodes in the execution platform 116. The monitor and workload analyzer 324 also redistributes tasks, as needed, based on changing workloads throughout the data processing platform 200 and may further redistribute tasks based on a user (i.e. "external") query workload that may also be processed by the execution platform 116. The configuration and metadata manager 322 and the monitor and workload analyzer 324 are coupled to a data storage device 326. Data storage devices 306 and 326 in FIG. 3 represent any data storage device within data processing platform 200. For example, data storage devices 306 and 326 may represent caches in execution platform 116, storage devices in storage platform 210, or any other storage device.

The compute service manager 102 also includes a transaction management and access control module 328, which manages the various tasks and other activities associated with the processing of data storage requests and data access requests. For example, transaction management and access control module 328 provides consistent and synchronized access to data by multiple users or systems. Since multiple users/systems may access the same data simultaneously, changes to the data must be synchronized to ensure that each user/system is working with the current version of the data. Transaction management and access control module 328 provides control of various data processing activities at a single, centralized location in the compute service manager 102. In some embodiments, the transaction management and access control module 328 interacts with the job executor 316 to support the management of various tasks being executed by the job executor 316.

Figure 4:
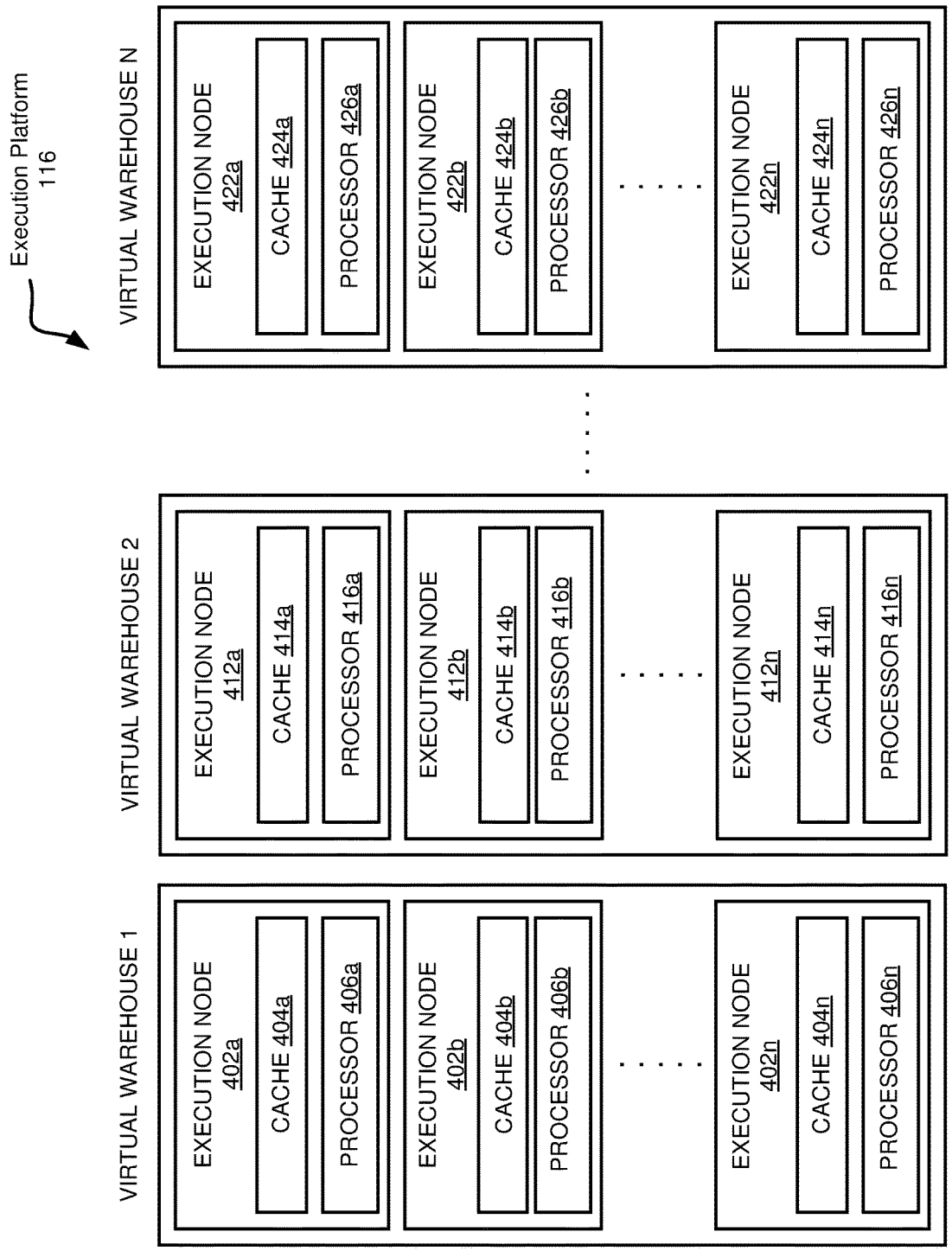
FIG. 4 is a block diagram illustrating an execution platform.

FIG. 4 is a block diagram depicting an embodiment of an execution platform 116. As shown in FIG. 4, execution platform 116 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 116 can add new virtual warehouses and drop existing virtual warehouses in real-time based on the current processing needs of the systems and users. This flexibility allows the execution platform 116 to quickly deploy large amounts of computing resources when needed without being forced to continue paying for those computing resources when they are no longer needed. All virtual warehouses can access data from any data storage device (e.g., any storage device in storage platform 210).

Although each virtual warehouse shown in FIG. 4 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 310a-310n shown in FIG. 3. Thus, the virtual warehouses are not necessarily assigned to a specific data storage device 212a-212n and, instead, can access data from any of the data storage devices 212a-212n within the storage platform 210. Similarly, each of the execution nodes shown in FIG. 4 can access data from any of the data storage devices 212a-212n. In some embodiments, a particular virtual warehouse or a particular execution node may be temporarily assigned to a specific data storage device, but the virtual warehouse or execution node may later access data from any other data storage device.

In the example of FIG. 4, virtual warehouse 1 includes three execution nodes 402a, 402b, and 402n. Execution node 402a includes a cache 404a and a processor 406a. Execution node 402b includes a cache 404b and a processor 406b. Execution node 402n includes a cache 404n and a processor 406n. Each execution node 402a, 402b, and 402n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 412a, 412b, and 412n. Execution node 412a includes a cache 414a and a processor 416a. Execution node 412b includes a cache 414b and a processor 416b. Execution node 412n includes a cache 414n and a processor 416n. Additionally, virtual warehouse 3 includes three execution nodes 422a, 422b, and 422n. Execution node 422a includes a cache 424a and a processor 426a. Execution node 422b includes a cache 424b and a processor 426b. Execution node 422n includes a cache 424n and a processor 426n.

In some embodiments, the execution nodes shown in FIG. 4 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 4 each include one data cache and one processor, alternate embodiments may include execution nodes containing any number of processors and any number of caches. Additionally, the caches may vary in size among the different execution nodes. The caches shown in FIG. 4 store, in the local execution node, data that was retrieved from one or more data storage devices in storage platform 210. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 210.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 116, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 4 as having multiple execution nodes. The multiple execution nodes associated with each virtual warehouse may be implemented using multiple computing systems at multiple geographic locations. For example, an instance of virtual warehouse 1 implements execution nodes 402a and 402b on one computing platform at a geographic location and implements execution node 402n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 116 is also fault tolerant. For example, if one virtual warehouse fails, that virtual warehouse is quickly replaced with a different virtual warehouse at a different geographic location.

A particular execution platform 116 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 210, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 5:
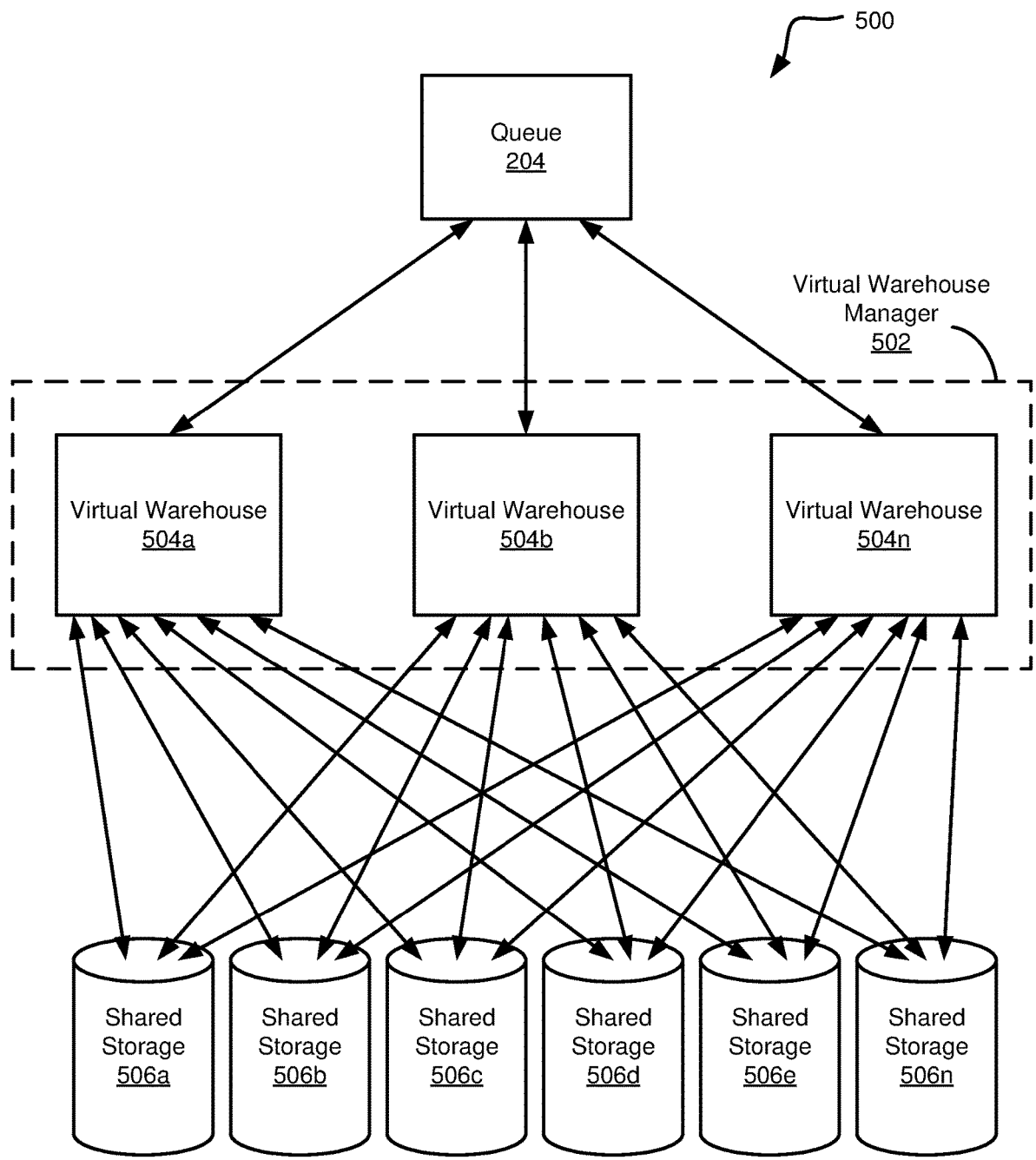
FIG. 5 is a block diagram illustrating an example operating environment.

FIG. 5 is a block diagram depicting an example operating environment 500 with the queue 204 in communication with multiple virtual warehouses under a virtual warehouse manager 502. In environment 500, the queue 204 has access to multiple database shared storage devices 506a, 506b, 506c, 506d, 506e and 506n through multiple virtual warehouses 504a, 504b, and 504n. Although not shown in FIG. 5, the queue 204 may access virtual warehouses 504a, 504b, and 504n through the compute service manager 102. In particular embodiments, databases 506a-506n are contained in the storage platform 210 and are accessible by any virtual warehouse implemented in the execution platform 116. In some embodiments, the queue 204 may access one of the virtual warehouses 504a-504n using a data communication network such as the Internet. In some implementations, a client account may specify that the queue 204 (configured for storing internal jobs to be completed) should interact with a particular virtual warehouse 504a-504n at a particular time.

In an embodiment (as illustrated), each virtual warehouse 504a-504n can communicate with all databases 506a-506n. In some embodiments, each virtual warehouse 504a-504n is configured to communicate with a subset of all databases 506a-506n. In such an arrangement, an individual client account associated with a set of data may send all data retrieval and data storage requests through a single virtual warehouse and/or to a certain subset of the databases 506a-506n. Further, where a certain virtual warehouse 504a-504n is configured to communicate with a specific subset of databases 506a-506n, the configuration is dynamic. For example, virtual warehouse 504a may be configured to communicate with a first subset of databases 506a-506n and may later be reconfigured to communicate with a second subset of databases 506a-506n.

In an embodiment, the queue 204 sends data retrieval, data storage, and data processing requests to the virtual warehouse manager 502, which routes the requests to an appropriate virtual warehouse 504a-504n. In some implementations, the virtual warehouse manager 502 provides a dynamic assignment of jobs to the virtual warehouses 504a-504n.

In some embodiments, fault tolerance systems create a new virtual warehouse in response to a failure of a virtual warehouse. The new virtual warehouse may be in the same virtual warehouse group or may be created in a different virtual warehouse group at a different geographic location.

The systems and methods described herein allow data to be stored and accessed as a service that is separate from computing (or processing) resources. Even if no computing resources have been allocated from the execution platform 116, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Figure 6:
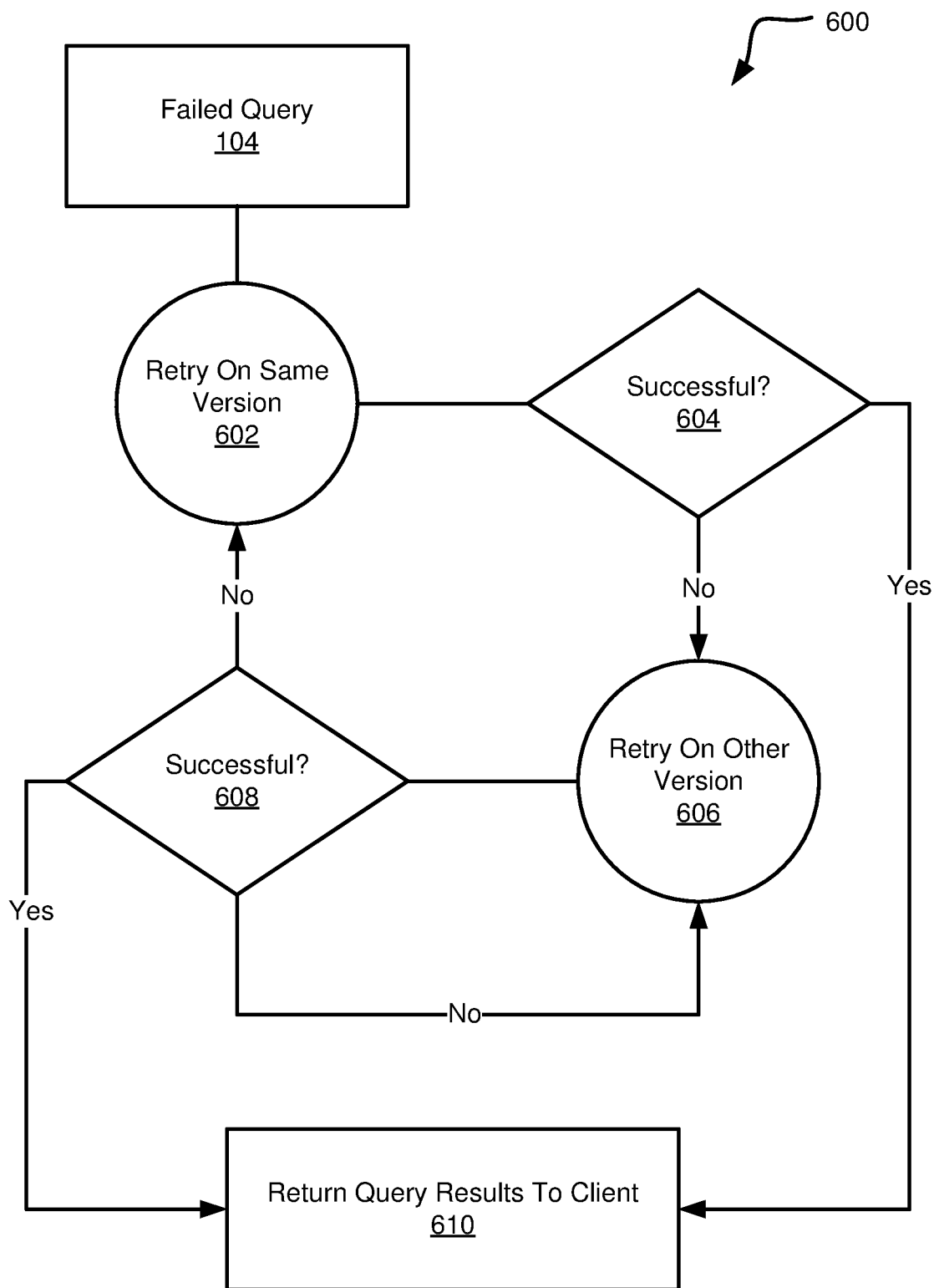
FIG. 6 is a schematic diagram of a process flow for retrying a failed query.

FIG. 6 is a diagram of a process flow 600 for retrying a failed query 104. The process flow 600 begins with an indication of a failed query 104. That indication of the failed query 104 may be a positive/negative message that indicates only that the attempt to execute the query failed and does not provide any indication of how or when the execution of the query failed. In response to the indication of the failed query 104, a compute service manager 102 or other computing resource may schedule the query to be retried at 602 on the same version of the database platform that was used for the original, failed execution of the query. The version of the database platform may be a collection of software or firmware code that indicates how the database platform should run. If the retry of the query is successful at 604, then the result of the query is returned to the client at 610. If the retry of the query is successful at 604, then it can be presumed that the original, failed execution of the query failed due to an intermittent fault. If the retry of the query is unsuccessful at 604, then a compute service manager 102 or other computing resource may schedule the query to be retried at 606 on some other version of the database platform that was not used for the original, failed execution of the query. If the retry of the query is successful at 608, then the query result may be returned to the client at 610. In an embodiment, after one or more attempts at the query or unsuccessful, an indication of an internal failure is sent to the client account. If the retry of the query is unsuccessful at 608, then the query may again be retried on some other version of the database platform or on the same version of the database platform. The query may be retried repeatedly until execution of the query is successful. The query may be run on any number of versions of the database platform.

If execution of the query is unsuccessful at 604 after being retried on the same version of the database platform at 602, and if the execution of the query is successful at 608 after being retried on some other version of the database platform at 606, then the original, failed execution of the query may have failed due to a system error rather than an intermittent fault. The query may be retried multiple times until a determination can be made that the query is failing due to an intermittent fault or the query is failing due to a system error. The system error may include an issue or bug in the software or firmware that supports the database platform. The multiple query retry attempts may be leveraged to identify bugs or errors in the software for the database platform.

Figure 7:
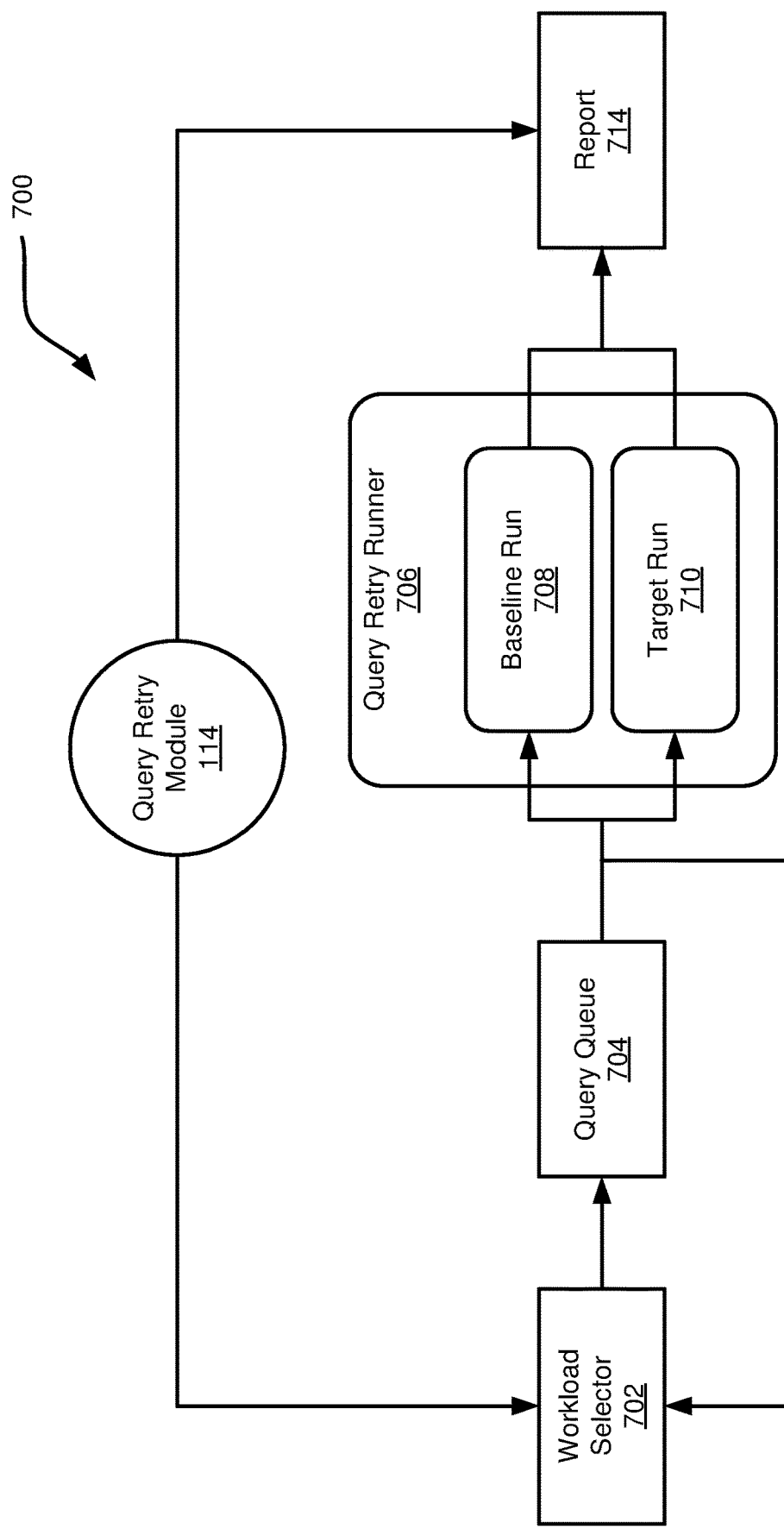
FIG. 7 is a schematic diagram of a process flow for a query retry run.

FIG. 7 is a process flow 700 for a query retry run. In an embodiment, the default mode for the query retry system is batch-oriented where a failed query 104 is selected up front and then run under different settings for comparison. This batch-oriented mode may work well for small to medium sized queries but may not work well for larger queries. Larger queries pose several problems. One problem posed by larger queries is that they take longer to run, and, even in the absence of a schema change, clients are constantly ingesting new data into the database. To enable results comparisons, the query retry system may use a fixed time travel version for each query retry which is typically set at the beginning of the run. When running a query in real-time on behalf of a client account, it is acceptable for the query to appear to run at any single arbitrary point after the client account first submitted the query request and before the client account receives the final response. This ensures that query executions are linearizable. That is, when a query is retried, it may appear the database sat idle for a long time before starting to execute the query (and in the meantime additional data may be ingested by other processes or client account), but this is still a correct execution.

The process flow 700 for the streaming mode addresses the aforementioned problems with the batch-oriented process flow. In the streaming mode process flow 700, the query retry module 114 determines query configuration and run settings. In an embodiment, failed queries 104 to rerun are selected incrementally by the workload selector 702 and added to a query queue 704 which then submits queries to the query retry runner 706. The query retry runner 706 takes in each query and multiplexes it to run with different settings before performing verification and comparison to generate the report 714. The query retry runner 706 will run the baseline run 708 and the target run 710 according to different parameters that may be determined by the query retry runner 706 or input by the query retry module 114. The results of the streaming runs may be periodically flushed to shared storage devices in the database system so that users may poll the latest results from an ongoing streaming run.

The baseline run 708 may have the same settings as the original, failed execution of the query. For example, the baseline run 708 may be managed by the same compute service instance, may be performed on the same version of the database platform, and may be executed by the same execution nodes as the original, failed execution of the query. The target run 710 may have one or more adjustments made relative to the original, failed execution of the query. For example, the target run 710 may be managed by a different compute service instance than the original, failed execution of the query. The target run 710 may be performed on a different version of the database platform than the original, failed execution of the query. The target run 710 may be executed by different execution nodes than the original, failed execution of the query.

Figure 8:
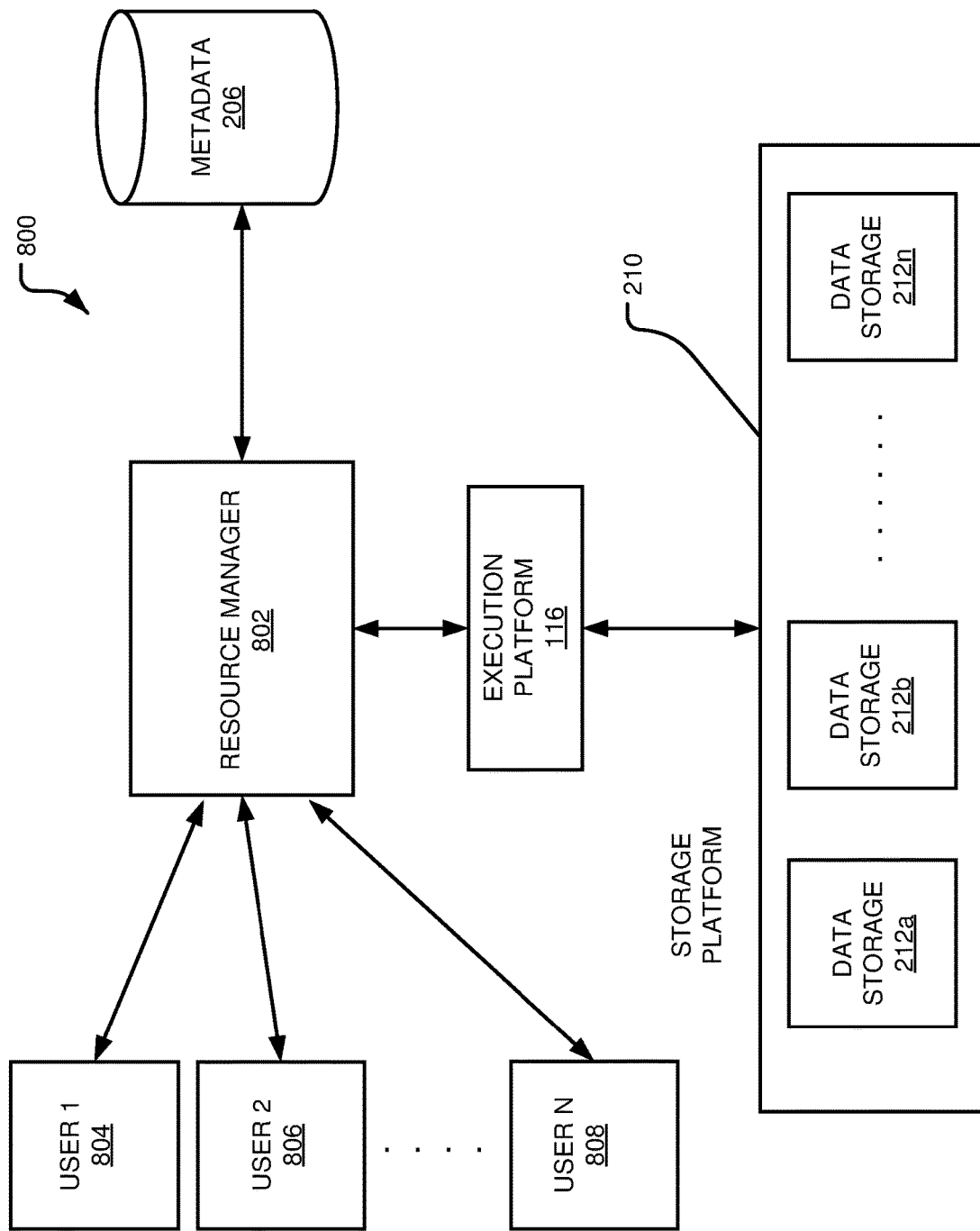
FIG. 8 is a block diagram illustrating a resource manager.

Referring now to FIG. 8, a computer system 800 is illustrated for running some of the methods disclosed herein. The computer system 800 may work with the data processing platform 200 to schedule, manage, and execute all tasks for the database platform. In an embodiment, the compute service manager 102 illustrated in FIG. 2 is configured to manage "internal" database tasks stored in a queue 204. Such tasks are not received from a client account and are performed for the purpose of improving database operations. The resource manager 802 shown in FIG. 8 is configured to manage "external" database tasks received from a client account such as a query request. Each of the compute service manager 102 and the resource manager 802 may be connected to the same storage platform 210, execution platform 116, and metadata 206 store. The resource manager 802 may be configured to receive a query request from a client account and manage the original execution of that query. If the original execution of the query fails, then the resource manager 802 may entry a retry request for the query in a queue 204 to be managed by the compute service manager 102. In an embodiment, the resource manager 802 includes all of the same components and modules as the compute service manager 102 as illustrated in FIG. 3.

As shown in FIG. 8, resource manager 802 may be coupled to multiple users 804, 806, 808. In particular implementations, resource manager 802 can support any number of users desiring access to the data processing platform 300. Users 804, 806, 808 may include, for example, end users providing data storage and retrieval requests, system administrators managing the systems and methods described herein, and other components/devices that interact with resource manager 802. The users 804, 806, 808 may be referred to herein as "clients" and may have a direct connection to one or more deployments as disclosed herein. Each of the users 804, 806, 808 may be connected to a primary deployment and have the capability to transition the connection from the primary deployment to a secondary deployment.

The resource manager 802 may be coupled to the metadata 206 store, which is associated with the entirety of data stored throughout data processing platform 300. In some embodiments, metadata 206 may include a summary of data stored in remote data storage systems as well as data available from a local cache. Additionally, metadata 206 may include information regarding how data is organized in the remote data storage systems and the local caches. Metadata 206 may allow systems and services to determine whether a piece of data needs to be processed without loading or accessing the actual data from a storage device.

Resource manager 802 may be further coupled to the execution platform 116, which provides multiple computing resources that execute various data storage and data retrieval tasks, as discussed in greater detail below. In an embodiment, there exists one or more execution platforms 116 used for executing client tasks, such as database queries and/or "internal" database tasks such as updating metadata, clustering a table, generating a materialized view, and so forth. In such an embodiment, there may also exist one or more execution platforms 116 used for incremental feature development and/or testing, and those execution platforms 116 are separate from the client execution platforms 116 such that client processing is not impacted by feature development tasks. Execution platform 116 may be coupled to multiple data storage devices 212a, 212b, 212n that are part of a storage platform 210. Although three data storage devices 212a, 212b, 212n are shown in FIG. 8, execution platform 116 is capable of communicating with any number of data storage devices. In some embodiments, data storage devices 212a, 212b, 212n are cloud-based storage devices located in one or more geographic locations. For example, data storage devices 212a, 212b, 212n may be part of a public cloud infrastructure or a private cloud infrastructure. Data storage devices 212a, 212b, 212n may be hard disk drives (HDDs), solid state drives (SSDs), storage clusters or any other data storage technology. Additionally, storage platform 210 may include distributed file systems (such as Hadoop Distributed File Systems (HDFS)), object storage systems, and the like.

In particular embodiments, the communication links between resource manager 802 and users 804, 806, 808, metadata 206, and execution platform 116 are implemented via one or more data communication networks. Similarly, the communication links between execution platform 116 and data storage devices 212a, 212b, 212n in storage platform 210 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 8, data storage devices 212a, 212b, 212n are decoupled from the computing resources associated with execution platform 116. In an embodiment, each of a plurality of database deployments may include storage platform 210 having multiple data storage devices 212a, 212b, 212n. Each of the storage platforms 314 across the multiple deployments may store a replica of the database data such that each of the multiple deployments is capable of serving as a primary deployment where updates and queries are executed on the database data. This architecture supports dynamic changes to data processing platform 800 based on the changing data storage/retrieval needs as well as the changing needs of the users and systems accessing data processing platform 800. The support of dynamic changes allows data processing platform 800 to scale quickly in response to changing demands on the systems and components within data processing platform 800. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 802, metadata 206, execution platform 116, and storage platform 210 are shown in FIG. 8 as individual components. However, each of resource manager 802, metadata 206, execution platform 116, and storage platform 210 may be implemented as a distributed system (e.g., distributed across multiple systems/platforms at multiple geographic locations). Additionally, each of resource manager 802, metadata 206, execution platform 116, and storage platform 210 can be scaled up or down (independently of one another) depending on changes to the requests received from users 804, 806, 808 and the changing needs of data processing platform 800. Thus, data processing platform 800 is dynamic and supports regular changes to meet the current data processing needs.

In various implementations of the disclosure, attempts to retry a query may be managed by a resource manager 802 and/or a compute service manager 102. In an embodiment, an original query request is received by the resource manager 802 from a client account, and the resource manager 802 manages the original attempt to execute the query. The resource manager 802 may pass the query on to a compute service manager 102 to manage one or more attempts to retry the query. Alternatively, the same resource manager 802 that managed the original, failed execution of the query may also manage one or more attempts to retry the query.

In an embodiment, the resource manager 802 is configured to assign a unique identification number to each query that is received from the users 804, 806, 808. The unique identification number enables the requesting user and/or client account to access and read the query and the query results. In an embodiment, when the original execution of the query fails and a retry execution of the query is successful, the unique identification may be altered to point to the retry execution of the query rather than the original execution of the query. In an embodiment, the unique identification number is used to determine a Uniform Resource Locator (URL) address where a client account may access the query and/or the query results.

Figure 9:
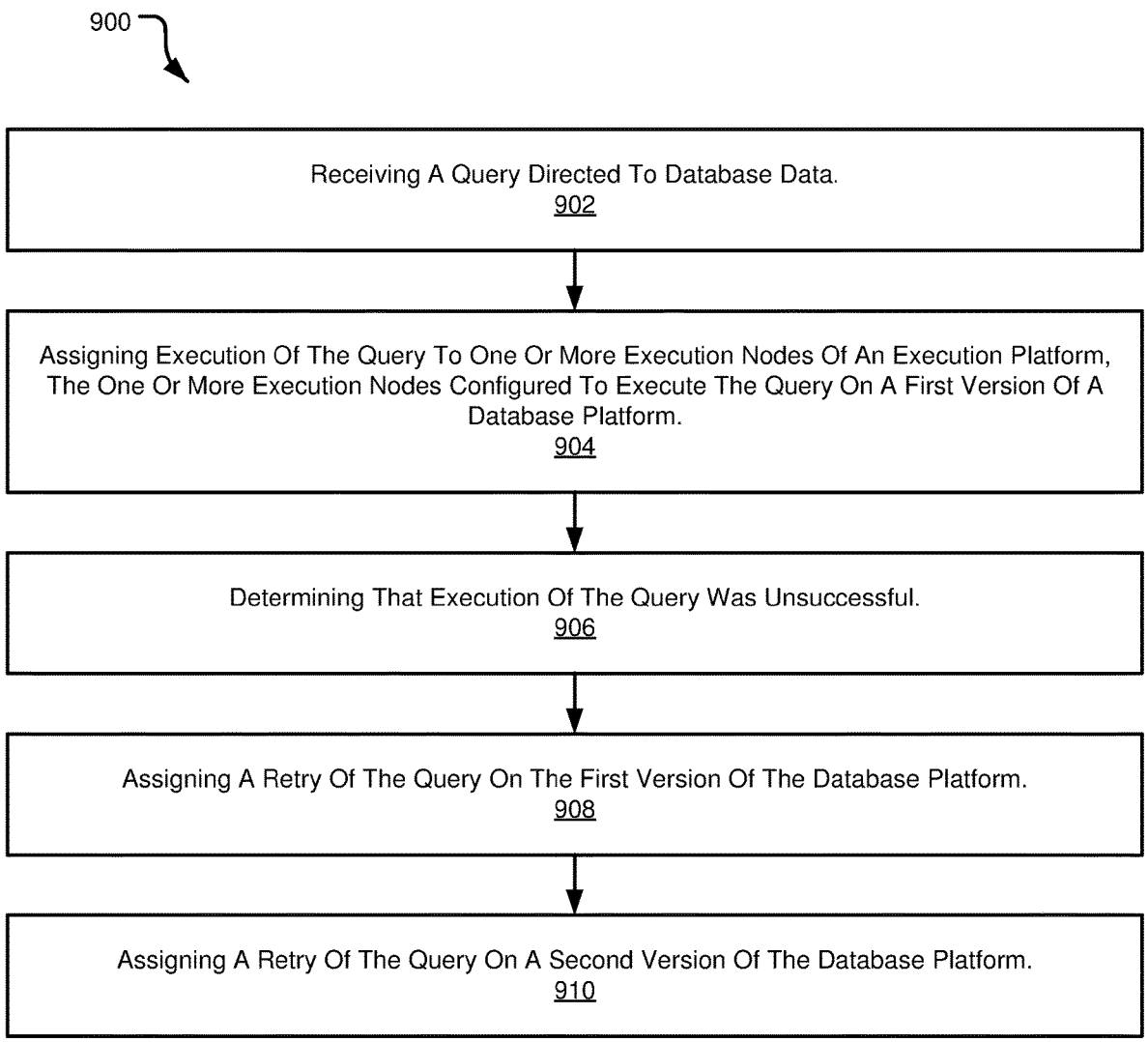
FIG. 9 is a schematic flow chart diagram of a method for retrying a failed query.

FIG. 9 is a schematic flow chart diagram of a method 900 for retrying a query. The method 900 may be executed by any suitable computing resources such as a compute service manager 102, a query retry module 114, and/or a resource manager 802. The method 900 may be executed by one or more database query managers which may generically refer to either of the compute service manager 102 and/or the resource manager 802.

The method 900 begins and the computing resource receives at 902 a query directed to database data. A computing resource assigns at 904 execution of the query to one or more execution nodes of an execution platform, wherein the one or more execution nodes are configured to execute the query on a first version of a database platform. The method 900 continues and a computing resource determines at 906 that execution of the query was unsuccessful. A computing resource assigns at 908 a retry of the query on the first version of the database platform. A computing resource assigns at 910 a retry of the query on a second version of the database platform. A computing resource may assign the retries of the query at 908 and 910 to the same one or more execution nodes of the execution platform and/or to other execution nodes of other execution platforms. The first version and the second version of the database platform may be versions of software or firmware that control and optimize operations for the database platform, including operations for the execution of a query.

Figure 10:
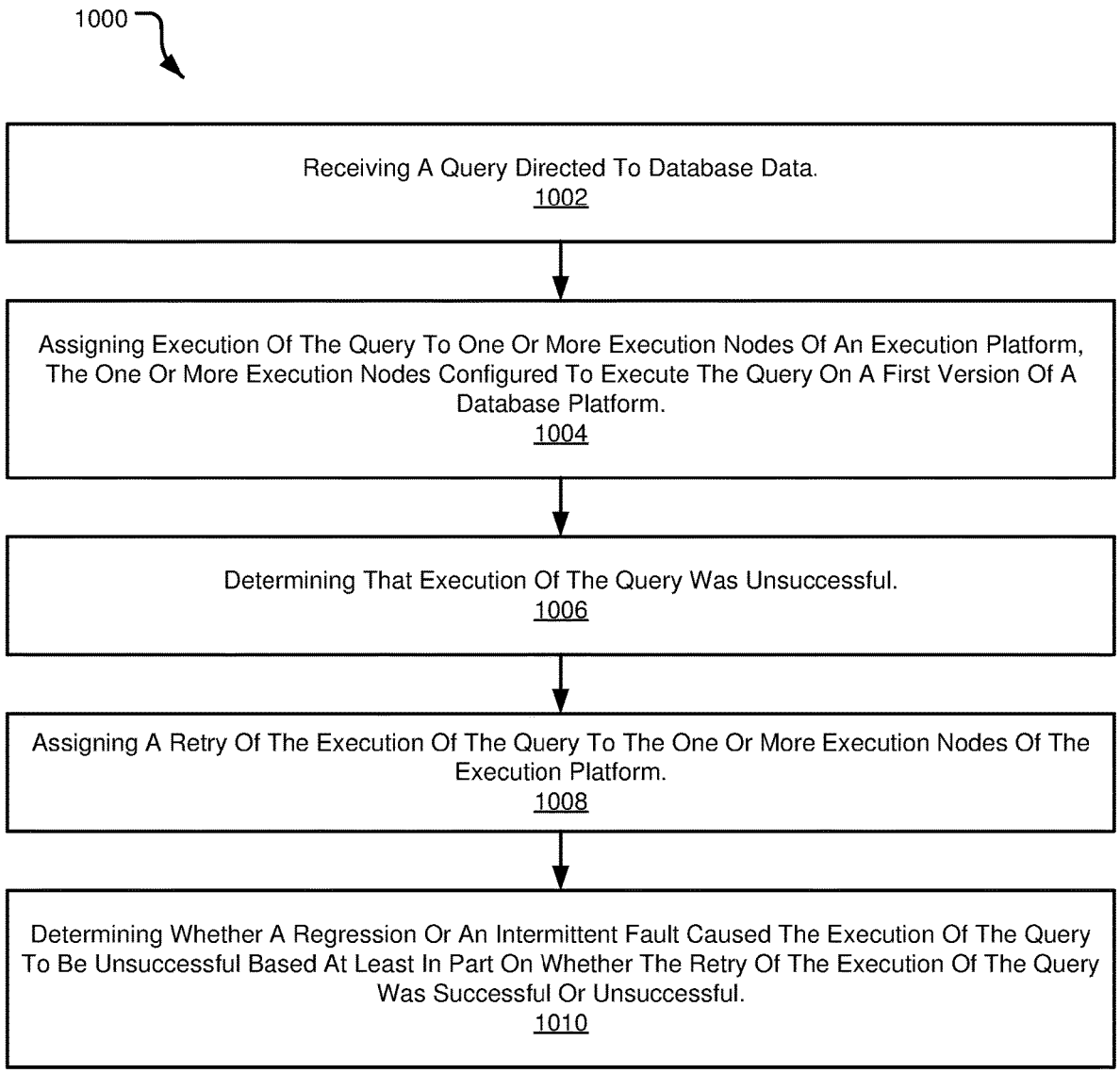
FIG. 10 is a schematic flow chart diagram of a method for determining whether a regression or intermittent fault caused a query to fail.

FIG. 10 is a schematic flow chart diagram of a method 1000 for retrying a query. The method 1000 may be executed by any suitable computing resources such as a compute service manager 102, a query retry module 114, and/or a resource manager 802. The method 1000 may be executed by one or more database query managers which may generically refer to either of the compute service manager 102 and/or the resource manager 802.

The method 1000 begins and a computing resource receives at 1002 a query directed to database data. A computing resource assigns at 1004 execution of the query to one or more execution nodes of an execution platform, wherein the one or more execution nodes are configured to execute the query on a first version of a database platform. The method 1000 continues and a computing resource determines at 1006 that execution of the query was unsuccessful. A computing resource assigns at 1008 a retry of the execution of the query to the one or more execution nodes of the execution platform. The method 1000 continues and a computing resource determines at 1010 whether a regression or an intermittent fault caused the execution of the query to be unsuccessful based on whether the retry of the execution of the query was successful or unsuccessful.

Figure 11:
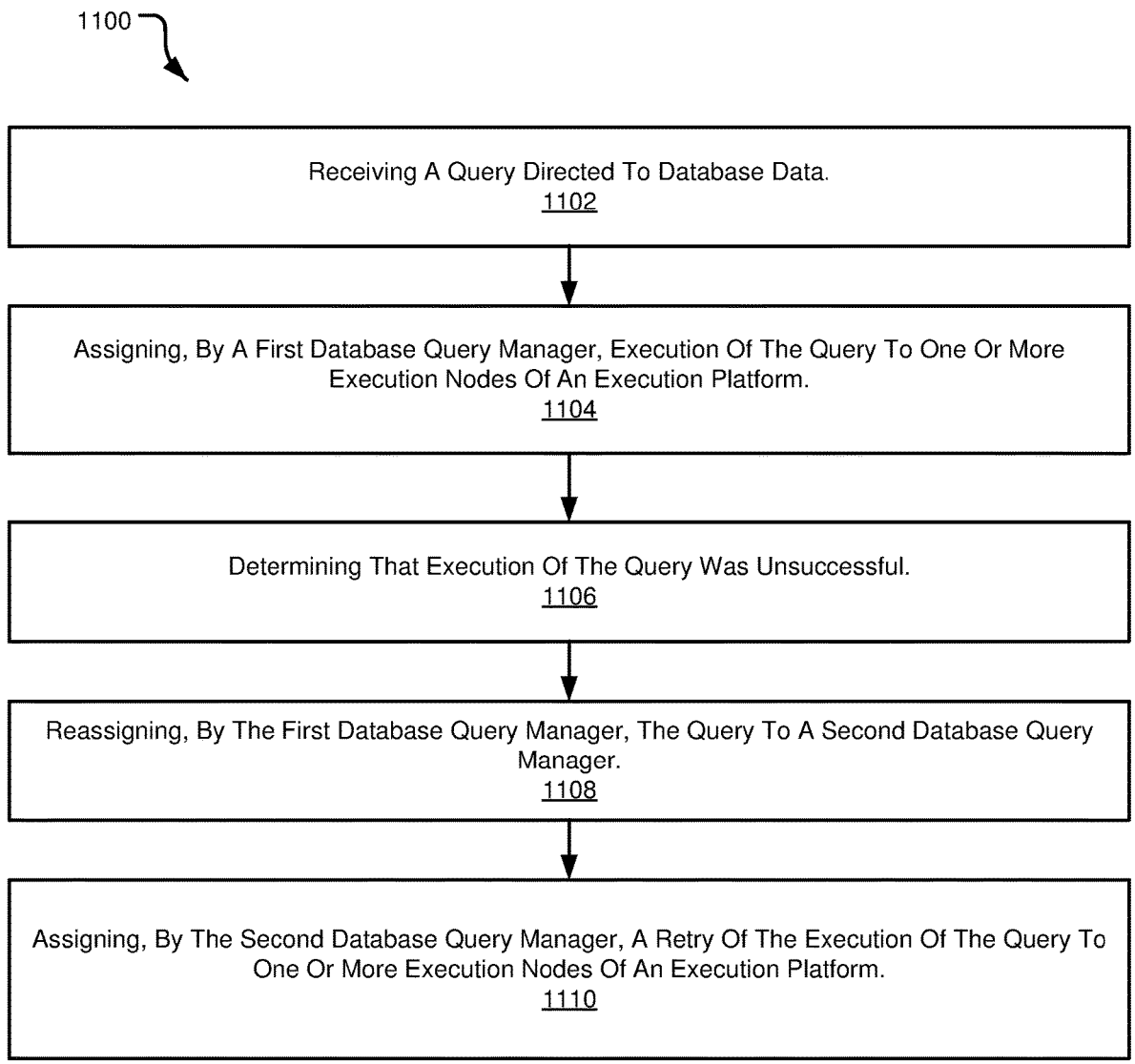
FIG. 11 is a schematic flow chart diagram of a method for retrying a failed query.

FIG. 11 is a schematic flow chart diagram of a method 1100 for retrying a query. The method 1100 may be executed by any suitable computing resources such as a compute service manager 102, a query retry module 114, and/or a resource manager 802. The method 1100 may be executed by one or more database query managers which may generically refer to either of the compute service manager 102 and/or the resource manager 802.

The method 1100 begins and a computing resource receives at 1102 a query directed to database data. A first database query manager assigns at 1104 execution of the query to one or more nodes of an execution platform. The method 1100 continues and a computing resource determines at 1106 that execution of the query was unsuccessful. The first database query manager reassigns at 1108 the query to a second database query manager. The method 1100 continues and the second database query manager assigns at 1110 a retry of the execution of the query to one or more execution nodes of an execution platform.

Figure 12:
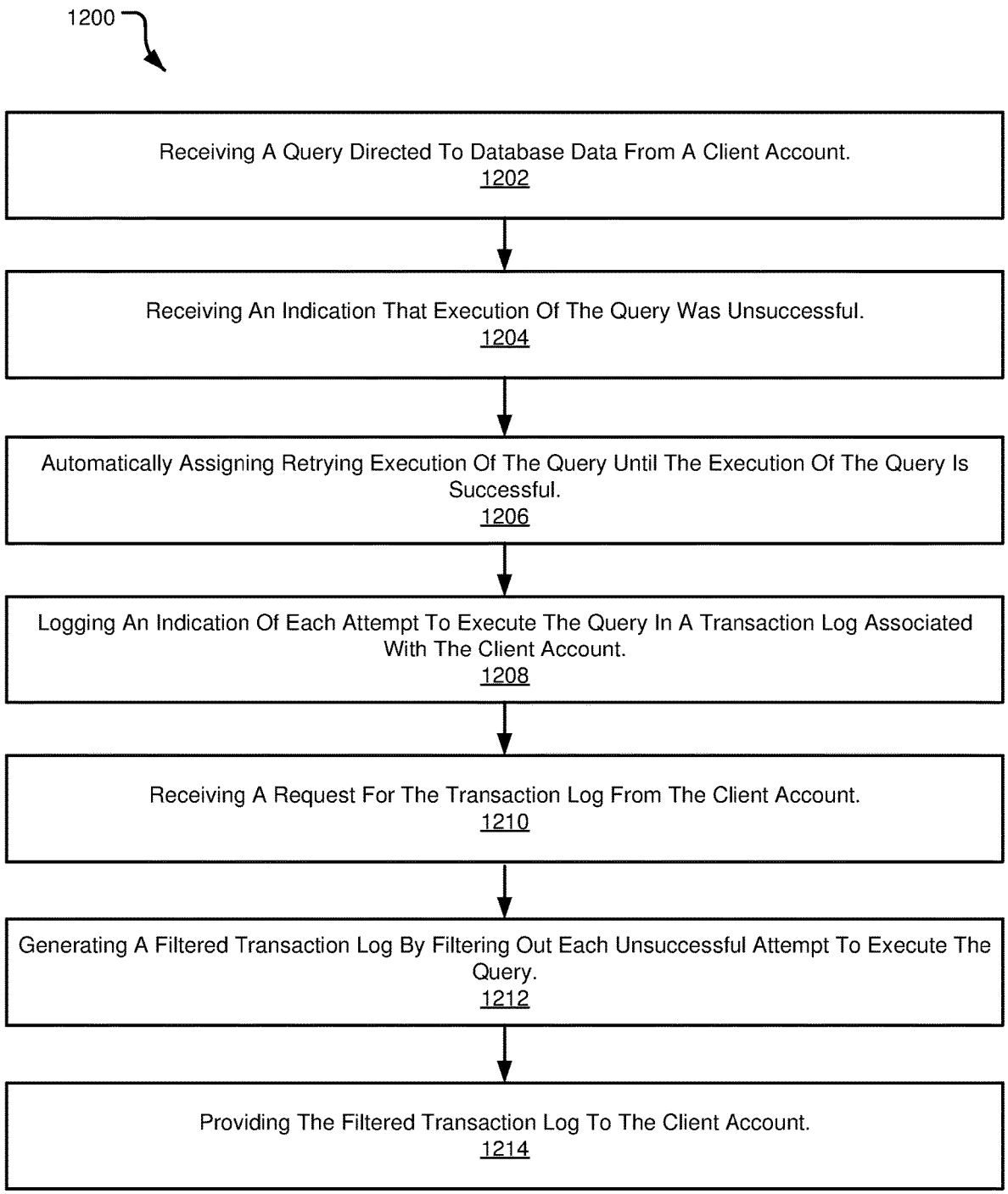
FIG. 12 is a schematic flow chart diagram of a method for generating and filtering a transaction log for query attempts in a database platform.

FIG. 12 is a schematic flow chart diagram of a method 1200 for retrying a query. The method 1200 may be executed by any suitable computing resources such as a compute service manager 102, a query retry module 114, and/or a resource manager 802. The method 1200 may be executed by one or more database query managers which may generically refer to either of the compute service manager 102 and/or the resource manager 802.

The method 1200 begins and a computing resource receives at 1202 a query directed to database data, wherein the query is received from a client account. The method 1200 continues and a computing resource receives at 1204 an indication that execution of the query was unsuccessful. A computing resource automatically assigns at 1206 one or more retries of executing the query until execution of the query is successful. The method 1200 continues and a computing resource logs at 1208 an indication of each attempt to execute the query in a transaction log associated with the client account. A computing resource receives at 1210 a request for the transaction log from the client account. A computing resource generates at 1212 a filtered transaction log by filtering out each unsuccessful attempt to execute the query. A computing resource provides at 1214 the filtered transaction log to the client account.

Figure 13:
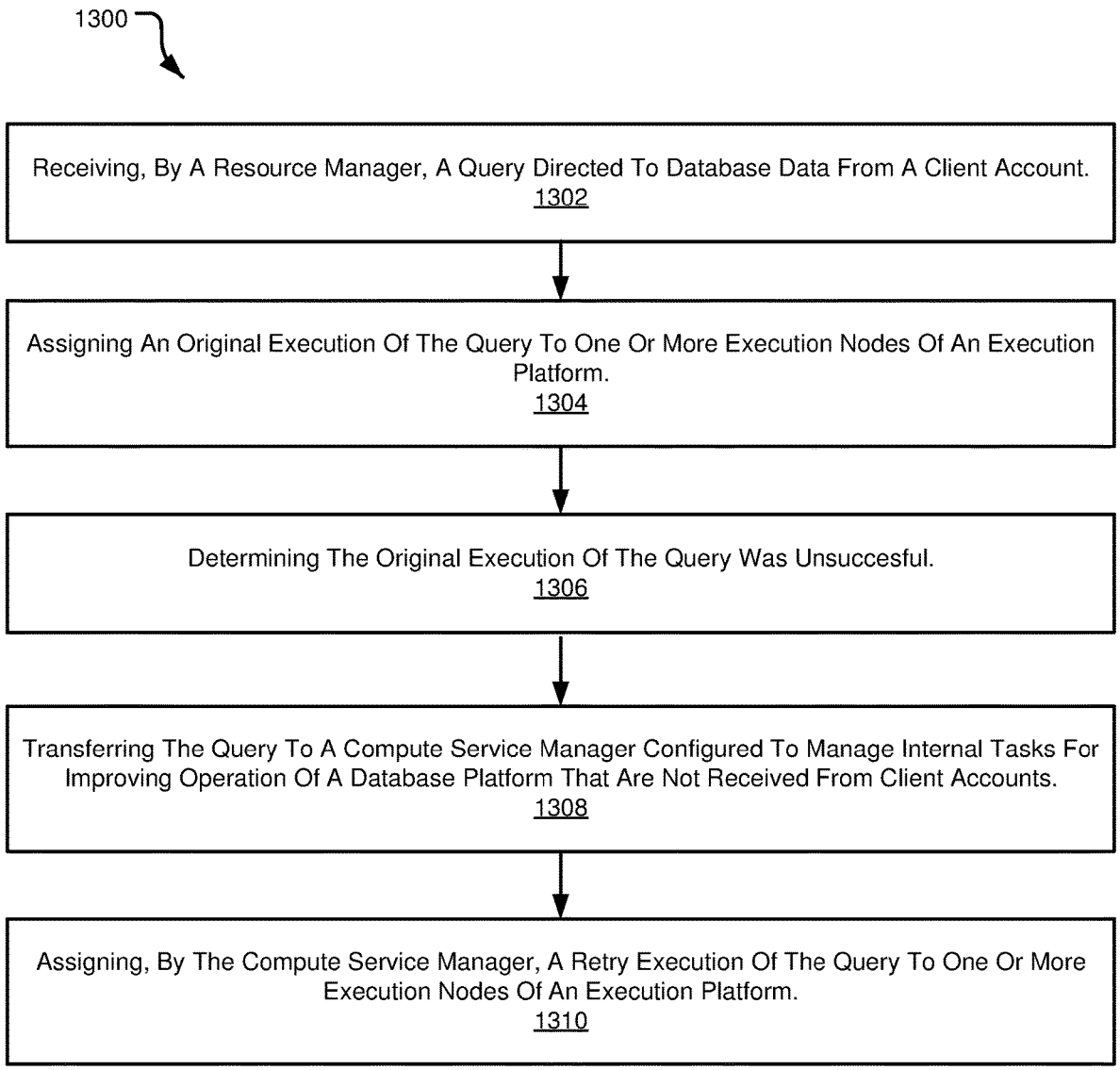
FIG. 13 is a schematic flow chart diagram of a method for retrying a failed query.

FIG. 13 is a schematic flow chart diagram of a method 1300 for retrying a query. The method 1300 may be executed by any suitable computing resources such as a compute service manager 102, a query retry module 114, and/or a resource manager 802. The method 1300 may be executed by one or more database query managers which may generically refer to either of the compute service manager 102 and/or the resource manager 802.

The method 1300 begins and a resource manager 802 receives at 1302 a query directed to database data from a client account. The resource manager 802 assigns at 1304 an original execution of the query to one or more execution nodes of an execution platform. The resource manager 802 determines at 1306 the original execution of the query was unsuccessful. The resource manager 802 transfers at 1308 the query to a compute service manager 102 configured to manage internal tasks for improving operation of a database platform that are not received from client accounts. The compute service manager 102 assigns at 1310 a retry execution of the query to one or more execution nodes of an execution platform.

Figure 14:
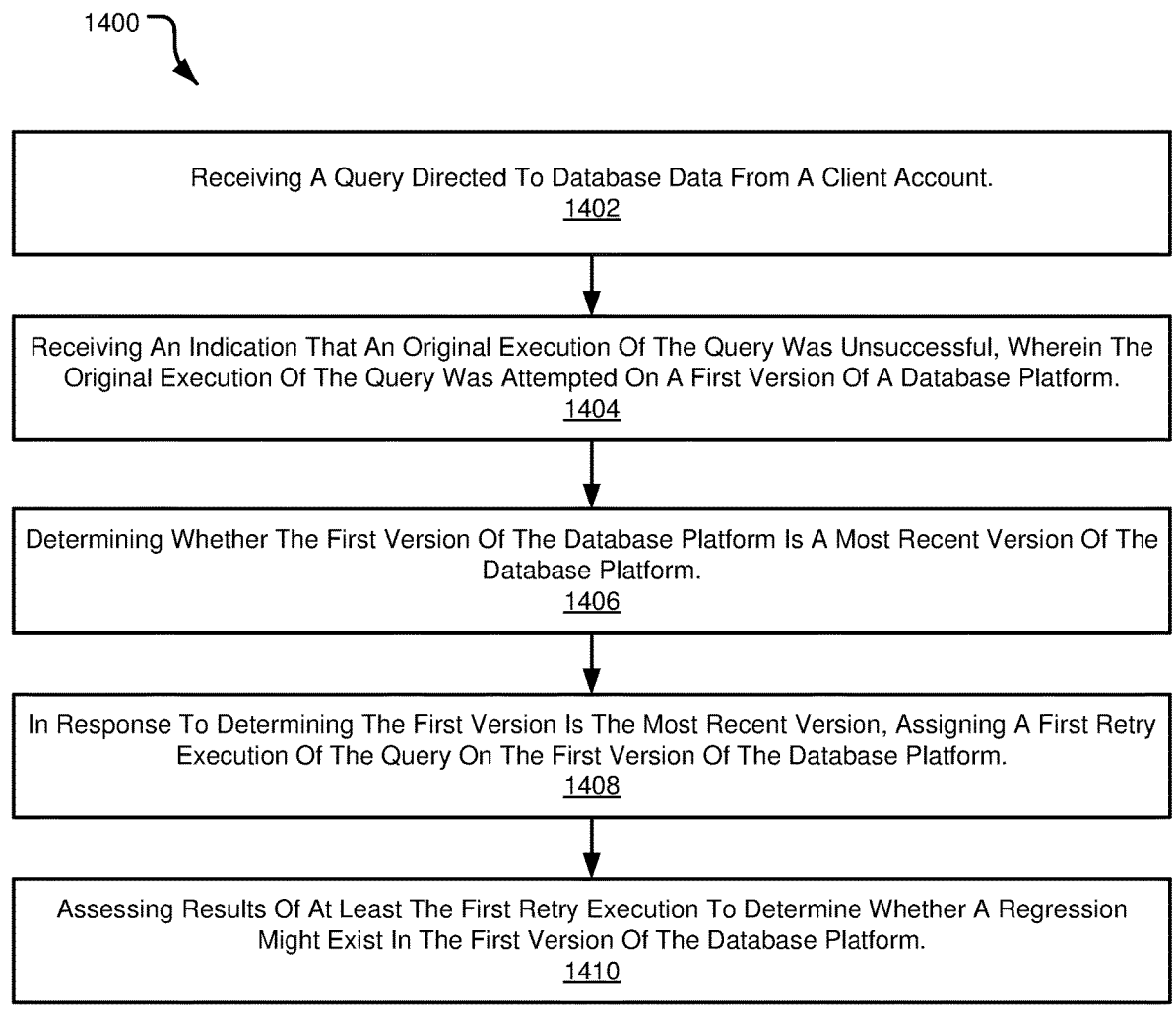
FIG. 14 is a schematic flow chart diagram of a method for retrying a failed query.

FIG. 14 is a schematic flow chart diagram of a method 1400 for retrying a query. The method 1400 may be executed by any suitable computing resources such as a compute service manager 102, a query retry module 114, and/or a resource manager 802. The method 1400 may be executed by one or more database query managers which may generically refer to either of the compute service manager 102 and/or the resource manager 802.

The method 1400 begins and a computing resource receives at 1402 a query directed to database data, wherein the query is received from a client account. The method 1400 continues and a computing resource receives at 1404 an indication that execution of the query was unsuccessful, wherein the execution of the query was attempted on a first version of a database platform. A computing resource determines at 1406 whether the first version of the database platform is the most recent version of the database platform. A computing resource assigns at 1408, in response to determining the first version is the most recent version, a first retry execution of the query on the first version of the database platform. A computing resource assess at 1510 results of at least the first retry execution to determine whether a regression might exist in the first version of the database platform.

Figure 15:
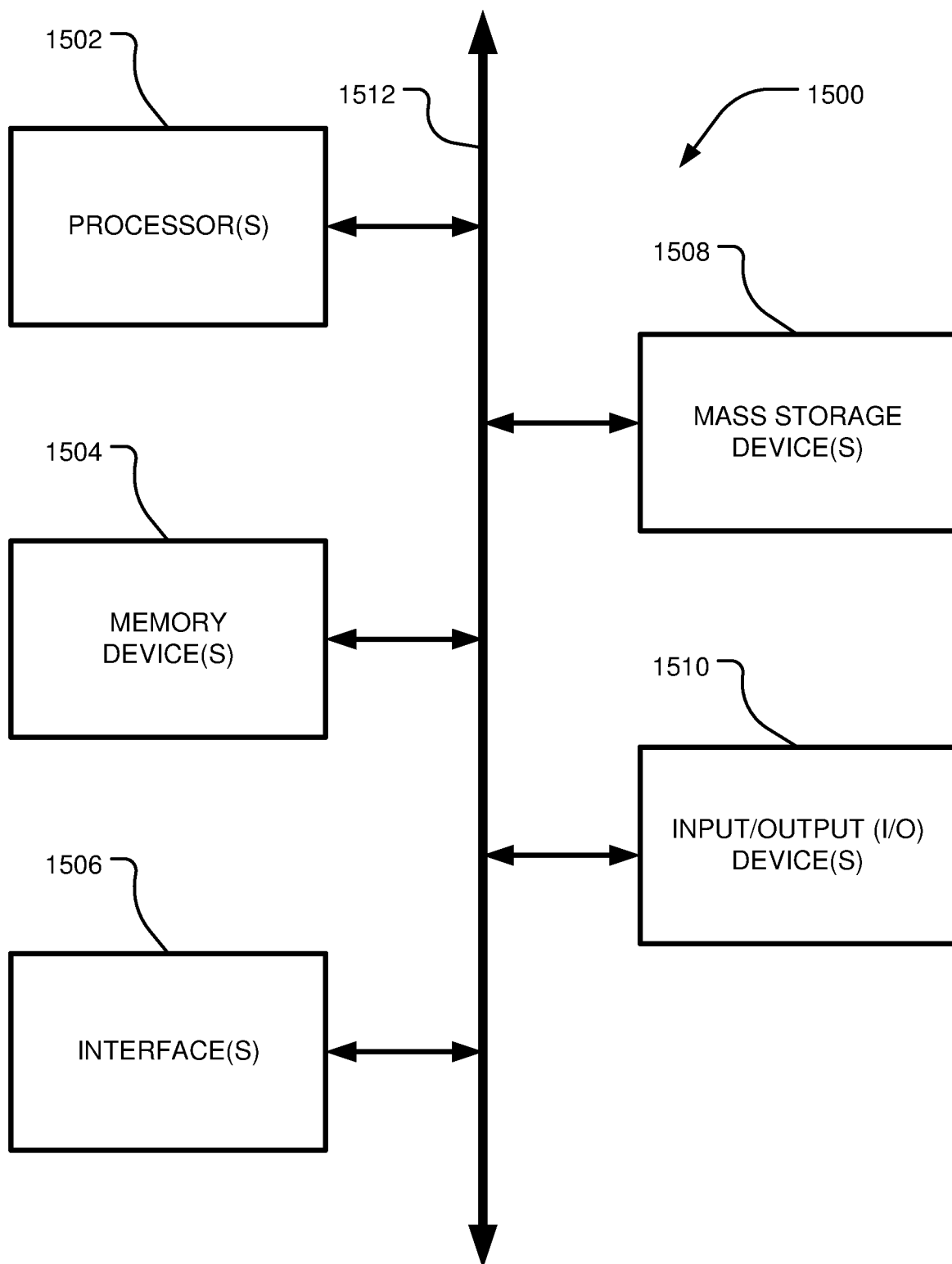
FIG. 15 is a schematic block diagram of an example computing device.

FIG. 15 is a block diagram depicting an example computing device 1500. In some embodiments, computing device 1500 is used to implement one or more of the systems and components discussed herein. For example, computing device 1500 may allow a user or administrator to access compute service manager 102 and/or resource manager 802. Further, computing device 1500 may interact with any of the systems and components described herein. Accordingly, computing device 1500 may be used to perform various procedures and tasks, such as those discussed herein. Computing device 1500 can function as a server, a client or any other computing entity. Computing device 1500 can be any of a wide variety of computing devices, such as a desktop computer, a notebook computer, a server computer, a handheld computer, a tablet, and the like.

Computing device 1500 includes one or more processor(s) 1502, one or more memory device(s) 1504, one or more interface(s) 1506, one or more mass storage device(s) 1508, and one or more Input/Output (I/O) device(s) 1510, all of which are coupled to a bus 1512. Processor(s) 1502 include one or more processors or controllers that execute instructions stored in memory device(s) 1504 and/or mass storage device(s) 1508. Processor(s) 1502 may also include various types of computer-readable media, such as cache memory.

Memory device(s) 1504 include various computer-readable media, such as volatile memory (e.g., random access memory (RAM)) and/or nonvolatile memory (e.g., read-only memory (ROM)). Memory device(s) 1504 may also include rewritable ROM, such as Flash memory.

Mass storage device(s) 1508 include various computer readable media, such as magnetic tapes, magnetic disks, optical disks, solid state memory (e.g., Flash memory), and so forth. Various drives may also be included in mass storage device(s) 1508 to enable reading from and/or writing to the various computer readable media. Mass storage device(s) 1508 include removable media and/or non-removable media.

I/O device(s) 1510 include various devices that allow data and/or other information to be input to or retrieved from computing device 1500. Example I/O device(s) 1510 include cursor control devices, keyboards, keypads, microphones, monitors or other display devices, speakers, printers, network interface cards, modems, lenses, CCDs or other image capture devices, and the like.

Interface(s) 1506 include various interfaces that allow computing device 1500 to interact with other systems, devices, or computing environments. Example interface(s) 1506 include any number of different network interfaces, such as interfaces to local area networks (LANs), wide area networks (WANs), wireless networks, and the Internet.

Bus 1512 allows processor(s) 1502, memory device(s) 1504, interface(s) 1506, mass storage device(s) 1508, and I/O device(s) 1510 to communicate with one another, as well as other devices or components coupled to bus 1512. Bus 1512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1500 and are executed by processor(s) 1502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments:

Example 1 is a method. The method includes receiving a query directed to database data and assigning execution of the query to one or more execution nodes of a database platform, wherein the one or more execution nodes configured to execute the query on a first version of the database platform. The method includes determining that execution of the query was unsuccessful. The method includes assigning a first retry execution of the query on the first version of the database platform. The method includes assigning a second retry execution of the query on a second version of the database platform.

Example 2 is a method as in Example 1, further comprising: determining whether the first retry execution on the first version of the database platform is successful; and determining whether the second retry execution on the second version of the database platform is successful.

Example 3 is a method as in any of Examples 1-2, further comprising, in response to determining the first retry execution is unsuccessful and the second retry execution is successful, generating a report indicating that a regression might exist in the first version of the database platform.

Example 4 is a method as in any of Examples 1-3, further comprising, in response to determining the first retry execution is successful and the second retry execution is successful, generating a report indicating that the original, unsuccessful execution of the query might have failed due to an intermittent fault.

Example 5 is a method as in any of Examples 1-4, further comprising, in response to determining the first retry execution is unsuccessful and the second retry execution is unsuccessful, generating a report indicating one or more of: a regression might exist in the first version of the database platform; a regression might exist in the second version of the database platform; or an error might exist with at least one of the one or more execution nodes of the database platform that attempted the original, unsuccessful execution of the query.

Example 6 is a method as in any of Examples 1-5, wherein: assigning the execution of the query to the one or more execution nodes is carried out by a resource manager that received the query directed to the database data; assigning the first retry execution of the query is carried out by a compute service manager configured to manage internal database tasks that are not received from a client account; and the assigning the second retry execution of the query is carried out by a compute service manager configured to manage internal database tasks that are not received from a client account.

Example 7 is a method as in any of Examples 1-6, wherein assigning the first retry execution of the query on the first version of the database platform further comprises one or more of: assigning a compute service manager to manage operation of the first retry execution of the query; or identifying one or more execution nodes to perform the first retry execution of the query.

Example 8 is a method as in any of Examples 1-7, further comprising, in response to at least one of the first retry execution or the second retry execution being successful, storing a response to the query such that the response is accessible by a client account that requested the query.

Example 9 is a method as in any of Examples 1-8, further comprising determining whether the query can be retried based on whether Structured Query Language (SQL) text for the query has been truncated.

Example 10 is a method as in any of Examples 1-9, further comprising determining whether the execution of the query was unsuccessful due to an internal error or a user error, wherein the internal error is an error associated with the database platform and the user error is an error associated with the text of the query, and wherein the assigning the first retry execution and the assigning the second retry execution occurs only if the original, unsuccessful execution of the query occurred due to an integral error.

Example 11 is a system. The system includes a multiple tenant cloud-based database platform comprising a plurality of shared storage devices collectively storing database data and an execution platform independent from the plurality of shared storage device. The system includes one or more processors for managing database tasks. The one or more processors are configured to receive a query directed to database data. The one or more processors are configured to assign execution of the query to one or more execution nodes of a database platform, the one or more execution nodes configured to execute the query on a first version of the database platform. The one or more processors are configured to determine that execution of the query was unsuccessful. The one or more processors are configured to assign a first retry execution of the query on the first version of the database platform. The one or more processors are configured to assign a second retry execution of the query on a second version of the database platform.

Example 12 is a system as in Example 11, wherein the one or more processors are further configured to: determine whether the first retry execution on the first version of the database platform is successful; and determine whether the second retry execution on the second version of the database platform is successful.

Example 13 is a system as in any of Examples 11-12, wherein the one or more processors are further configured to, in response to determining the first retry execution is unsuccessful and the second retry execution is successful, generate a report indicating that a regression might exist in the first version of the database platform.

Example 14 is a system as in any of Examples 11-13, wherein the one or more processors are further configured to, in response to determining the first retry execution is successful and the second retry execution is successful, generate a report indicating that the original, unsuccessful execution of the query might have failed due to an intermittent fault.

Example 15 is a system as in any of Examples 11-14, wherein the one or more processors are further configured to, in response to determining the first retry execution is unsuccessful and the second retry execution is unsuccessful, generate a report indicating one or more of: a regression might exist in the first version of the database platform; a regression might exist in the second version of the database platform; or an error might exist with at least one of the one or more execution nodes of the database platform that attempted the original, unsuccessful execution of the query.

Example 16 is a system as in any of Examples 11-15, wherein: the one or more processors that assign the execution of the query to the one or more execution nodes are part of a resource manager that received the query directed to the database data; the one or more processors that assign that assign the first retry execution of the query are part of a compute service manager configured to manage internal database tasks that are not received from a client account; and the one or more processors that assign that assign the second retry execution of the query are part of a compute service manager configured to manage internal database tasks that are not received from a client account.

Example 17 is a system as in any of Examples 11-16, wherein the one or more processors are configured to assign the first retry execution of the query on the first version of the database platform by one or more of: assigning a compute service manager to manage operation of the first retry execution of the query; or identifying one or more execution nodes to perform the first retry execution of the query.

Example 18 is a system as in any of Examples 11-17, wherein the one or more processors are further configured to, in response to at least one of the first retry execution or the second retry execution being successful, store a response to the query such that the response is accessible by a client account that requested the query.

Example 19 is a system as in any of Examples 11-18, wherein the one or more processors are further configured to determine whether the query can be retried based on whether Structured Query Language (SQL) text for the query has been truncated.

Example 20 is a system as in any of Examples 11-19, wherein the one or more processors are further configured to determine the execution of the query was unsuccessful due to an internal error or a user error, wherein the internal error is an error associated with the database platform and the user error is an error associated with the text of the query, and wherein the one or more processors are configured to assign the first retry execution and assign the second retry execution only if the original, unsuccessful execution of the query occurred due to an integral error.

Example 21 is one or more processors configurable to execute instructions stored in non-transitory computer readable storage media. The instructions include receiving a query directed to database data. The instructions include assigning execution of the query to one or more execution nodes of a database platform, the one or more execution nodes configured to execute the query on a first version of the database platform. The instructions include determining that execution of the query was unsuccessful. The instructions include assigning a first retry execution of the query on the first version of the database platform. The instructions include assigning a second retry execution of the query on a second version of the database platform.

Example 22 is one or more processors as in Example 21, wherein the instructions further comprise: determining whether the first retry execution on the first version of the database platform is successful; and determining whether the second retry execution on the second version of the database platform is successful.

Example 23 is one or more processors as in any of Examples 21-22, wherein the instructions further comprise, in response to determining the first retry execution is unsuccessful and the second retry execution is successful, generating a report indicating that a regression might exist in the first version of the database platform.

Example 24 is one or more processors as in any of Examples 21-23, wherein the instructions further comprise, in response to determining the first retry execution is successful and the second retry execution is successful, generating a report indicating that the original, unsuccessful execution of the query might have failed due to an intermittent fault.

Example 25 is one or more processors as in any of Examples 21-24, wherein the instructions further comprise, in response to determining the first retry execution is unsuccessful and the second retry execution is unsuccessful, generating a report indicating one or more of: a regression might exist in the first version of the database platform; a regression might exist in the second version of the database platform; or an error might exist with at least one of the one or more execution nodes of the database platform that attempted the original, unsuccessful execution of the query.

Example 26 is one or more processors as in any of Examples 21-25, wherein the instructions are such that: assigning the execution of the query to the one or more execution nodes is carried out by a resource manager that received the query directed to the database data; the assigning the first retry execution of the query is carried out by a compute service manager configured to manage internal database tasks that are not received from a client account; and the assigning the second retry execution of the query is carried out by a compute service manager configured to manage internal database tasks that are not received from a client account.

Example 27 is one or more processors as in any of Examples 21-26, wherein the instructions are such that assigning the first retry execution of the query on the first version of the database platform further comprises one or more of: assigning a compute service manager to manage operation of the first retry execution of the query; or identifying one or more execution nodes to perform the first retry execution of the query.

Example 28 is one or more processors as in any of Examples 21-27, wherein the instructions further comprise, in response to at least one of the first retry execution or the second retry execution being successful, storing a response to the query such that the response is accessible by a client account that requested the query.

Example 29 is one or more processors as in any of Examples 21-28, wherein the instructions further comprise determining whether the query can be retried based on whether Structured Query Language (SQL) text for the query has been truncated.

Example 30 is one or more processors as in any of Examples 21-29, wherein the instructions further comprise determining whether the execution of the query was unsuccessful due to an internal error or a user error, wherein the internal error is an error associated with the database platform and the user error is an error associated with the text of the query, and wherein the assigning the first retry execution and the assigning the second retry execution occurs only if the original, unsuccessful execution of the query occurred due to an integral error.

Example 31 is a method. The method includes receiving a query directed to database data and assigning execution of the query to one or more execution nodes of an execution platform, the one or more execution nodes configured to execute the query on a first version of a database platform. The method includes determining that execution of the query was unsuccessful. The method includes assigning a first retry execution of the query to the one or more execution nodes of the execution platform. The method includes determining whether a regression or an intermittent fault caused the execution of the query to be unsuccessful based at least in part on whether the first retry execution of the query was successful or unsuccessful.

Example 32 is a method as in Example 31, further comprising assigning a second retry execution of the query to one or more other execution nodes that did not attempt the execution of the original, unsuccessful execution of the query.

Example 33 is a method as in any of Examples 31-32, further comprising assigning a third retry execution of the query to be performed on a second version of the database platform.

Example 34 is a method as in any of Examples 31-33, wherein determining whether a regression or an intermittent fault caused the execution of the query to be unsuccessful comprises determining based on results of the first retry execution, the second retry execution, and the third retry execution of the query.

Example 35 is a method as in any of Examples 31-34, further comprising, in response to determining the first retry execution is unsuccessful and the second retry execution is successful, generating a report indicating that the original, unsuccessful execution of the query might have failed due to an issue within at least one of the one or more execution nodes.

Example 36 is a method as in any of Examples 31-35, further comprising, in response to determining the first retry execution is unsuccessful and the third retry execution is successful, generating a report indicating that a regression might exist in the first version of the database platform.

Example 37 is a method as in any of Examples 31-36, further comprising, in response to determining the first retry execution is unsuccessful, the second retry execution is unsuccessful, and the third retry execution is unsuccessful, generating a report indicating one or more of: a regression might exist in the first version of the database platform; a regression might exist in the second version of the database platform; an issue might exist with at least one of the one or more execution nodes of the database platform; an issue might exist with at least one of the one or more other execution nodes associated with the second retry execution; or an intermittent fault might be occurring.

Example 38 is a method as in any of Examples 31-37, further comprising determining whether the query can be retried based on whether Structured Query Language (SQL) text for the query has been truncated.

Example 39 is a method as in any of Examples 31-38, further comprising determining whether the execution of the query was unsuccessful due to an internal error or a user error, wherein the internal error is an error associated with the database platform and the user error is an error associated with the text of the query, and wherein the assigning the first retry execution and the assigning the second retry execution occurs only if the original, unsuccessful execution of the query occurred due to an integral error.

Example 40 is a method as in any of Examples 31-39, further comprising generating a transaction log comprising an entry for each attempt to execute the query.

Example 41 is a method. The method includes receiving a query directed to database data and assigning, by a first database query manager, execution of the query to one or more execution nodes of an execution platform. The method includes determining that execution of the query was unsuccessful. The method includes reassigning, by the first database query manager, the query to a second database query manager to be retried. The method includes assigning, by the second database query manager, a retry of the execution of the query to one or more execution nodes of an execution platform.

Example 42 is a method as in Example 41, further comprising determining whether the query was originally executed on a new version of the database platform, and wherein reassigning the query to the second database query manager is done in response to determining the query was originally executed on a new version of the database platform.

Example 43 is a method as in any of Examples 41-42, further comprising determining whether a regression might exist in the new version of the database platform based at least in part on the results of the retry of the execution of the query.

Example 44 is a method as in any of Examples 41-43, wherein the reassigning the query to the second database query manager is performed in response to determining that execution of the query was unsuccessful due to an internal error.

Example 45 is a method as in any of Examples 41-44, further comprising: determining whether the execution of the query was unsuccessful due to an internal error; in response to determining the execution of the query was unsuccessful due to an internal error, generating an error message for an account that requested the query indicating the query failed due to an internal error; and recording a service incident indicating the query failed due to an internal error.

Example 46 is a method as in any of Examples 41-45, wherein the reassigning the query to the second database query manager is performed in response to the recording the service incident indicating the query failed due to an internal error.

Example 47 is a method as in any of Examples 41-46, wherein the first database query manager is running a first version of a database platform and the second database query manager is running a second version of the database platform, wherein the first version and the second version of the database platform were released at different times and comprise different software.

Example 48 is a method as in any of Examples 41-47, wherein the database platform comprises multiple database query managers collectively running two or more versions of the database platform at one time.

Example 49 is a method as in any of Examples 41-48, further comprising analyzing results of the retry of the execution of the query to determine whether the execution of the query was unsuccessful likely due to an intermittent fault or a regression in the first version of the database platform.

Example 50 is a method as in any of Examples 41-49, wherein assigning the retry of the execution of the query comprises assigning execution of the query to different execution nodes that did not attempt the execution of the query.

Example 51 is a method. The method includes receiving a query directed to database data from a client account and receiving an indication that an original execution of the query was unsuccessful. The method includes automatically assigning retrying execution of the query until execution of the query is successful. The method includes logging an indication of each attempt to execute the query in a transaction log associated with the client account. The method includes receiving a request for the transaction log from the client account and generating a filtered transaction log by filtering out each unsuccessful attempt to execute the query. The method includes providing the filtered transaction log to the client account.

Example 52 is a method as in Example 51, wherein automatically assigning retrying execution of the query comprises: assigning a query retry to be managed by a first database query manager that managed the original execution of the query; and assigning a query retry to be managed by a second database query manager that did not manage the original execution of the query.

Example 53 is a method as in any of Examples 51-52, further comprising analyzing all query retry attempts to determine whether the original execution of the query was unsuccessful due to an intermittent fault or a regression in software run by the first database query manager.

Example 54 is a method as in any of Examples 51-53, wherein automatically assigning retrying execution of the query comprises: assigning a query retry to be performed by a first set of execution nodes that attempted the original execution of the query; and assigning a query retry to be performed by a second set of execution nodes that did not attempt the original execution of the query.

Example 55 is a method as in any of Examples 51-54, further comprising analyzing all query retry attempts to determine whether the original execution of the query was unsuccessful due to an intermittent fault or a hardware issue on at least one execution node of the first set of execution nodes.

Example 56 is a method as in any of Examples 51-55, wherein automatically assigning retrying execution of the query comprises: assigning a query retry to be performed on a first version of a database platform that was used to attempt the original execution of the query; and assigning a query retry to be performed on a second version of the database platform that was not used to attempt the original execution of the query.

Example 57 is a method as in any of Examples 51-56, further comprising analyzing all query retry attempts to determine whether the original execution of the query was unsuccessful due to an intermittent fault or a regression in the first version of the database platform.

Example 58 is a method as in any of Examples 51-57, wherein automatically assigning retrying the execution of the query comprises assigning each query retry attempt to a single instance of a database query manager such that no query retry attempt is managed by more than one instance of a database query manager.

Example 59 is a method as in any of Examples 51-58, wherein the logging the indication of each attempt to execute the query comprises logging one or more of: an indication of which instance of a database query manager managed each attempt; an indication of which version of a database platform was run to perform each attempt; an indication of which execution nodes were used to perform each attempt; an indication of when each attempt was started; or an indication of when each attempt was completed.

Example 60 is a method as in any of Examples 51-59, further comprising: in response to receiving the indication that the original execution of the query was unsuccessful, providing a notification to the client account indicating that the original execution of the query was unsuccessful; in response to receiving an indication that at least one retry attempt is successful, providing a notification to the client account indicating that the query has been successfully executed.

Example 61 is a method. The method includes receiving a query directed to database data from a client account. The method includes receiving an indication that an original execution of the query was unsuccessful, wherein the original execution of the query was attempted on a first version of a database platform. The method includes determining whether the first version of the database platform is a most recent version of the database platform. The method includes, in response to determining the first version is the most recent version, assigning a first retry execution of the query on the first version of the database platform. The method includes assessing results of at least the first retry execution to determine whether a regression might exist in the first version of the database platform.

Example 62 is a method as in Example 61, further comprising assigning a second retry execution of the query on a second version of the database platform, wherein the second version of the database platform is not the most recent version of the database platform.

Example 63 is a method as in any of Examples 61-62, further comprising assessing results of the first retry execution and the second retry execution to determine whether a regression might exist in the first version of the database platform.

Example 64 is a method as in any of Examples 61-63, further comprising determining whether Structured Query Language (SQL) text for the query has been truncated, and wherein assigning the first retry execution of the query is performed only if the SQL text for the query has not been truncated.

Example 65 is a method as in any of Examples 61-64, further comprising populating a transaction log for the client account comprising a listing of all actions performed for the client account, wherein populating the transaction log comprising entering an indication that the original execution of the query was unsuccessful.

Example 66 is a method as in any of Examples 61-65, further comprising determining whether the original execution of the query was unsuccessful due to an internal error, and wherein the assigning the first retry execution of the query is performed only if the original execution of the query is unsuccessful due to an internal error.

Example 67 is a method as in any of Examples 61-66, further comprising storing a record of the original execution of the query in a key value store, wherein the record comprises one or more of: Structured Query Language (SQL) text for the query; a start timestamp when execution of the query began; a completion timestamp when execution of the query failed; an indication of whether the query failed due to an internal error, an error in the SQL text for the query; or an intermittent fault; or a unique identification for the query that enables the client account to access results of the query.

Example 68 is a method as in any of Examples 61-67, wherein the query is associated with a unique identification to enable the client account to access the query and wherein the method further comprises: receiving an indication that at least one retry attempt for the query is successful; and rerouting the unique identification to point to a successful retry attempt rather than the original execution of the query.

Example 69 is a method as in any of Examples 61-68, wherein the assigning the first retry execution of the query comprises: removing the query from a resource manager configured to manage external tasks received from the client account; and assigning the first retry execution to a compute service manager configured to manage internal tasks for improving operation of the database platform that are not received from the client account.

Example 70 is a method as in any of Examples 61-69, wherein assigning the first retry execution to the compute service manager comprises entering one or more retry attempts in a queue of the compute service, wherein the queue of the compute service manager comprises a listing of all internal tasks for improving operation of the database platform.

Example 71 is a method. The method includes receiving, by a first database query manager, a query directed to database data from a client account. The method includes assigning an original execution of the query to one or more execution nodes of an execution platform. The method includes determining the original execution of the query was unsuccessful. The method includes transferring the query to a second database query manager configured to manage internal tasks for improving operation of a database platform that are not received from client accounts. The method includes assigning, by the second database query manager, a retry execution of the query to one or more execution nodes of an execution platform.

Example 72 is a method as in Example 71, wherein the first database query manager is configured to manage external tasks received from client accounts.

Example 73 is a method as in any of Examples 71-72, further comprising identifying the second database query manager based on one or more of: whether the second database query manager is implementing the same version of the database platform as the first database query manager; a workload of the second database query manager; or whether the version of the database platform implemented by the first database query manager and/or the second database query manager is a most recent version of the database platform.

Example 74 is a method as in any of Examples 71-73, further comprising, in response to determining the first database query manager and the second database query manager are implementing the same version of the database platform, transferring the query to the second database query manager and further assigning the query to a third database query manager that is configured to manage internal tasks and is implementing a different version of the database platform.

Example 75 is a method as in any of Examples 71-74, wherein the transferring the query to the second database query manager comprising entering the query as a job in a queue of the second database query manager, wherein the queue receives a plurality of jobs for improving the operation of the database platform.

Example 76 is a method as in any of Examples 71-75, wherein the one or more execution nodes of the execution platform that attempted the original execution of the query are each running the same version of the database platform, wherein the database platform comprises a plurality of execution nodes collectively running multiple versions of the database platform.

Example 77 is a method as in any of Examples 71-76, further comprising determining whether the retry execution of the query should be assigned to the one or more execution nodes of the execution platform that attempted the original execution of the query based on one or more of: whether the one or more execution nodes are running the most recent version of the database platform; whether an issue has been identified in a server of at least one of the one or more execution nodes; whether the one or more execution nodes have at least a portion of data responsive to the query stored in cache storage; a storage availability of the one or more execution nodes; or a processing availability of the one or more execution nodes.

Example 78 is a method as in any of Examples 71-77, wherein the database platform comprises a plurality of database query managers collectively implementing two or more versions of the database platform, wherein new versions of the database platform are implemented on a portion of the plurality of database query managers.

Example 79 is a method as in any of Examples 71-78, wherein the client account is a tenant in a multiple tenant cloud-based database platform and the method further comprises: tracking an amount of processing resources used to execute the original execution of the query and the retry execution of the query; associating the tracked processing resources with the client account; and providing a log to the client account of all processing resources used by the client account.

Example 80 is a method as in any of Examples 71-79, further comprising determining whether the original execution of the query failed due to an error in Structured Query Language (SQL) text of the query or an internal error, wherein the method comprises transferring the query to the second database query manager only if the original execution of the query failed due to an internal error.

Example 81 is means for implementing any of the methods in Examples 1-80.

Example 82 is non-transitory computer readable storage media storing instructions for implementing any of the methods in Examples 1-80.

Example 83 is a multiple tenant cloud-based database platform comprising processors configurable to execute instructions stored in non-transitory computer readable storage media, wherein the instructions comprise any of the methods in Examples 1-80.

Example 84 is one or more processors configurable to execution instructions, wherein the instructions comprise any of the methods in Examples 1-80.

Many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, the appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

Further, it should be noted, and particularly with reference to the claims below, a "first retry attempt," a "second retry attempt," a "third retry attempt," and so forth are not necessarily performed in sequential order unless specifically indicated. The indicators of "first," "second," "third," and so forth are included for simplifying reference only and are not limiting to the scope of the claims. The parameters of different retry attempts may be performed in any order and are not limited by the "first," "second," and "third" indicators.

What is claimed is:

1. A method comprising:
   decoding, by at least one hardware processor, a query directed to database data from a client account of a database platform;
   decoding, by the at least one hardware processor, an indication that execution of the query on at least one computing node of the database platform results in a failed execution;
   configuring, by the at least one hardware processor, a processing loop with continuous retry executions of the query on the at least one computing node based on the indication of the failed execution, the continuous retry executions associated with configurations of the at least one computing node that are based on a prior configuration of the at least one computing node used during the failed execution;
   exiting the processing loop based on detecting a retry execution of the continuous retry executions results in at least one successful execution of the query; and
   logging each attempt to execute the query during the continuous retry executions in a query status log until the at least one successful execution of the query.

2. The method of claim 1, further comprising:
   decoding, by the at least one hardware processor, a request for the query status log, the request received from the client account of the database platform.

3. The method of claim 2, further comprising:
   modifying the query status log based on the request to generate a modified query status log, the modifying including filtering out at least one unsuccessful attempt to execute the query during the continuous retry executions; and
   encoding the modified query status log for transmission to the client account in response to the request.

4. The method of claim 1, further comprising:
   configuring a first retry execution of the query of the continuous retry executions on the at least one computing node, the at least one computing node configured with a first set of configurations.

5. The method of claim 4, further comprising:
   determining the first retry execution of the query results in the failed execution; and
   configuring a second retry execution of the query of the continuous retry executions on the at least one computing node, the at least one computing node configured with the first set of configurations for the second retry execution.

6. The method of claim 4, further comprising:
determining the first retry execution of the query results in the failed execution; and
configuring a second retry execution of the query of the continuous retry executions on the at least one computing node, the at least one computing node configured with a second set of configurations for the second retry execution.

7. The method of claim 4, further comprising:
determining the first retry execution of the query results in the failed execution; and
configuring a second retry execution of the query of the continuous retry executions on at least a second computing node, the at least a second computing node configured with the first set of configurations for the second retry execution.

8. The method of claim 4, further comprising:
determining the first retry execution of the query results in the failed execution; and
configuring a second retry execution of the query of the continuous retry executions on at least a second computing node, the at least a second computing node configured with a second set of configurations for the second retry execution.

9. The method of claim 1, further comprising:
configuring, by the at least one hardware processor, the continuous retry executions of the query while the at least one computing node is configured with a same set of configurations during each retry execution.

10. The method of claim 1, further comprising:
configuring, by the at least one hardware processor, the continuous retry executions of the query while the at least one computing node is configured with a different set of configurations during each retry execution.

11. A system comprising:
at least one hardware processor of a database platform; and
at least one memory storing instructions that cause the at least one hardware processor to perform operations comprising:
decoding a query directed to database data from a client account of a database platform;
decoding an indication that execution of the query on at least one computing node of the database platform results in a failed execution;
configuring a processing loop with continuous retry executions of the query on the at least one computing node based on the indication of the failed execution, the continuous retry executions associated with configurations of the at least one computing node that are based on a prior configuration of the at least one computing node used during the failed execution;
exiting the processing loop based on detecting a retry execution of the continuous retry executions results in at least one successful execution of the query; and
logging each attempt to execute the query during the continuous retry executions in a query status log until the at least one successful execution of the query.

12. The system of claim 11, the operations further comprising:
decoding a request for the query status log, the request received from the client account of the database platform.

13. The system of claim 12, the operations further comprising:
modifying the query status log based on the request to generate a modified query status log, the modifying including filtering out at least one unsuccessful attempt to execute the query during the continuous retry executions; and
encoding the modified query status log for transmission to the client account in response to the request.

14. The system of claim 11, the operations further comprising:
configuring a first retry execution of the query of the continuous retry executions on the at least one computing node, the at least one computing node configured with a first set of configurations.

15. The system of claim 14, the operations further comprising:
determining the first retry execution of the query results in the failed execution; and
configuring a second retry execution of the query of the continuous retry executions on the at least one computing node, the at least one computing node configured with the first set of configurations for the second retry execution.

16. The system of claim 14, the operations further comprising:
determining the first retry execution of the query results in the failed execution; and
configuring a second retry execution of the query of the continuous retry executions on the at least one computing node, the at least one computing node configured with a second set of configurations for the second retry execution.

17. The system of claim 14, the operations further comprising:
determining the first retry execution of the query results in the failed execution; and
configuring a second retry execution of the query of the continuous retry executions on at least a second computing node, the at least a second computing node configured with the first set of configurations for the second retry execution.

18. The system of claim 14, the operations further comprising:
determining the first retry execution of the query results in the failed execution; and
configuring a second retry execution of the query of the continuous retry executions on at least a second computing node, the at least a second computing node configured with a second set of configurations for the second retry execution.

19. The system of claim 11, the operations further comprising:
configuring the continuous retry executions of the query while the at least one computing node is configured with a same set of configurations during each retry execution.

20. The system of claim 11, the operations further comprising:
configuring the continuous retry executions of the query while the at least one computing node is configured with a different set of configurations during each retry execution.

21. A computer-storage medium comprising instructions that, when executed by one or more processors of a machine in a database platform, configure the machine to perform operations comprising:

decoding a query directed to database data from a client account of a database platform;

decoding an indication that execution of the query on at least one computing node of the database platform results in a failed execution;

configuring a processing loop with continuous retry executions of the query on the at least one computing node based on the indication of the failed execution, the continuous retry executions associated with configurations of the at least one computing node that are based on a prior configuration of the at least one computing node used during the failed execution;

exiting the processing loop based on detecting a retry execution of the continuous retry executions results in at least one successful execution of the query; and logging each attempt to execute the query during the continuous retry executions in a query status log until the at least one successful execution of the query.

22. The computer-storage medium of claim 21, the operations further comprising:

decoding a request for the query status log, the request received from the client account of the database platform.

23. The computer-storage medium of claim 22, the operations further comprising:

modifying the query status log based on the request to generate a modified query status log, the modifying including filtering out at least one unsuccessful attempt to execute the query during the continuous retry executions; and encoding the modified query status log for transmission to the client account in response to the request.

24. The computer-storage medium of claim 21, the operations further comprising:

configuring a first retry execution of the query of the continuous retry executions on the at least one computing node, the at least one computing node configured with a first set of configurations.

25. The computer-storage medium of claim 24, the operations further comprising:

determining the first retry execution of the query results in the failed execution; and configuring a second retry execution of the query of the continuous retry executions on the at least one computing node, the at least one computing node configured with the first set of configurations for the second retry execution.

26. The computer-storage medium of claim 24, the operations further comprising:

determining the first retry execution of the query results in the failed execution; and configuring a second retry execution of the query of the continuous retry executions on the at least one computing node, the at least one computing node configured with a second set of configurations for the second retry execution.

27. The computer-storage medium of claim 24, the operations further comprising:

determining the first retry execution of the query results in the failed execution; and configuring a second retry execution of the query of the continuous retry executions on at least a second computing node, the at least a second computing node configured with the first set of configurations for the second retry execution.

28. The computer-storage medium of claim 24, the operations further comprising:

determining the first retry execution of the query results in the failed execution; and configuring a second retry execution of the query of the continuous retry executions on at least a second computing node, the at least a second computing node configured with a second set of configurations for the second retry execution.

29. The computer-storage medium of claim 21, the operations further comprising:

configuring the continuous retry executions of the query while the at least one computing node is configured with a same set of configurations during each retry execution.

30. The computer-storage medium of claim 21, the operations further comprising:

configuring the continuous retry executions of the query while the at least one computing node is configured with a different set of configurations during each retry execution.

* * * * *